United States Patent
Hamada et al.

(10) Patent No.: US 8,989,184 B2
(45) Date of Patent: Mar. 24, 2015

(54) MESSAGE RELAY APPARATUS AND METHOD

(71) Applicant: Fujitsu Limited, Kawasaki-shi (JP)

(72) Inventors: Kei Hamada, Fukuoka (JP); Kouichirou Amemiya, Kawasaki (JP); Yasushi Kurokawa, Fukuoka (JP); Yuichiro Katsura, Onga (JP)

(73) Assignee: Fujitsu Limited, Kawasaki (JP)

( * ) Notice: Subject to any disclaimer, the term of this patent is extended or adjusted under 35 U.S.C. 154(b) by 170 days.

(21) Appl. No.: 13/716,255

(22) Filed: Dec. 17, 2012

(65) Prior Publication Data

US 2013/0242994 A1  Sep. 19, 2013

(30) Foreign Application Priority Data

Mar. 19, 2012 (JP) ................................. 2012-062097

(51) Int. Cl.
| | |
|---|---|
| H04L 12/54 | (2013.01) |
| H04L 12/761 | (2013.01) |
| H04L 29/08 | (2006.01) |
| H04L 12/58 | (2006.01) |

(52) U.S. Cl.
CPC ............ *H04L 45/16* (2013.01); *H04L 67/2823* (2013.01); *H04L 51/06* (2013.01); *H04L 51/14* (2013.01)
USPC ....................................................... 370/390

(58) Field of Classification Search
CPC ..... H04L 45/16; H04L 67/2823; H04L 51/06; H04L 51/14
USPC ....................................................... 370/390
See application file for complete search history.

(56) References Cited

U.S. PATENT DOCUMENTS

| | | | | |
|---|---|---|---|---|
| 7,134,075 | B2 * | 11/2006 | Hind et al. | 715/239 |
| 8,010,598 | B2 * | 8/2011 | Tanimoto | 709/203 |
| 8,107,452 | B1 * | 1/2012 | Upadhyay et al. | 370/338 |
| 8,718,028 | B1 * | 5/2014 | Upadhyay et al. | 370/338 |
| 2004/0215829 | A1 * | 10/2004 | Hubbard et al. | 709/246 |
| 2011/0264752 | A1 * | 10/2011 | Lee et al. | 709/206 |
| 2012/0120879 | A1 * | 5/2012 | Ozawa | 370/328 |

FOREIGN PATENT DOCUMENTS

| | | |
|---|---|---|
| JP | H07-253951 A | 10/1995 |
| JP | H08-221372 A | 8/1996 |
| JP | 2000-010937 | 1/2000 |

\* cited by examiner

*Primary Examiner* — Min Jung

(74) *Attorney, Agent, or Firm* — Fujitsu Patent Center

(57) ABSTRACT

A disclosed apparatus is a message relay apparatus. This message relay apparatus includes: a receiver that receives a message to be transferred; a determination unit that determines whether or not the message relay apparatus can afford to perform a conversion processing, when performing the conversion processing for the message; a selection unit that selects another apparatus to which the conversion processing is requested based on stored information representing other apparatuses that can afford to perform the conversion processing, when the message relay apparatus cannot afford to perform the conversion processing; a requesting unit that requests the selected another apparatus to perform the conversion processing for the message, and receives the converted message from the selected another apparatus; and a transmission unit that transmits the received and converted message to a transfer destination.

10 Claims, 21 Drawing Sheets

| MESSAGE TYPE | CONFIRMATION MESSAGE |
|---|---|
| REQUESTING SOURCE NODE | 10.10.0.254 (MESSAGE RELAY APPARATUS 5a) |
| CANDIDATE NODE | 10.10.0.253 (MESSAGE RELAY APPARATUS 5b) |

FIG.6

| MESSAGE TYPE | RESPONSE MESSAGE |
|---|---|
| REQUESTING SOURCE NODE | 10.10.0.254 (MESSAGE RELAY APPARATUS 5a) |
| CANDIDATE NODE | 10.10.0.253 (MESSAGE RELAY APPARATUS 5b) |
| RESOURCE USE | APPROVAL |

FIG.7

| MESSAGE TYPE | DELETION MESSAGE |
|---|---|
| TRANSMISSION SOURCE NODE | 10.10.0.254 (MESSAGE RELAY APPARATUS 5a) |
| NODE TO BE DELETED | 10.10.0.251 (MESSAGE RELAY APPARATUS 5d) |

FIG.9

| REQUEST URI | TRANSFER DESTINATION SERVER |
|---|---|
| /service/A1 | 10.10.10.1 |
| /service/A2 | 10.10.10.2 |
| /service/B1 | 10.10.10.11 |
| /service/B2 | 10.10.10.12 |
| ⋮ | ⋮ |

FIG.11

| REQUEST URI | CONVERSION RULE |
|---|---|
| /service/A1 | AtoCVS.xsl |
| /service/A2 | AtoSOAP.xsl |
| /service/B1 | BtoCVS.xsl |
| /service/B2 | BtoSOAP.xsl |
| ⋮ | ⋮ |

| VACANT NODE ENTRY |
|---|
| 10.10.0.253(MESSAGE RELAY APPARATUS 5b) |
| 10.10.0.251(MESSAGE RELAY APPARATUS 5d) |
| ⋮ |

| TRANSFER DESTINATION SERVER | 10.10.10.1 |
|---|---|
| CONVERSION RULE | AtoCVS.xsl |
| REQUESTING SOURCE NODE | — |

| | | |
|---|---|---|
| ORIGINAL MESSAGE | HTTP/1.1 /service/A1¥r¥n<br>Cookie:<br>JSESSIONID=55D95DFFF39788A6729C2F74018AA23C¥r¥n<br>Content-Type: text/html;charset=ISO-8859-1¥r¥n<br>Date: Tue, 29 Jan 2008 12:38:25 GMT¥r¥n<br>Connection: Keep-Alive¥r¥n<br>Content-Length: 302¥r¥n<br>¥r¥n | |
| | <?xml version="1.0" encoding="Shift_JIS"?><br><member_info><br>  <member><br>    <number>1</number><br>    <name>Taro</name><br>    <address>Kawasaki</address><br>    <mail>taro@hoge.com</mail><br>  </member><br>  <member><br>    <number>2</number><br>    <name>Hanako</name><br>    <address>Fukuoka</address><br>    <mail>hanako@foo.com</mail><br>  </member><br></member_info> | |
| MESSAGE CONTROL INFORMATION | TRANSFER DESTINATION SERVER | 10.10.10.1 |
| | CONVERSION RULE | AtoCVS.xsl |
| | REQUESTING SOURCE NODE | 10.10.0.254<br>(MESSAGE RELAY APPARATUS 5a) |

FIG.20

| | |
|---|---|
| CONVERSION MESSAGE | HTTP/1.1 /service/A1\r\n<br>Cookie: JSESSIONID=55D95DFFF39788A6729C2F74018AA23C\r\n<br>Content-Type: text/html;charset=ISO-8859-1\r\n<br>Date: Tue, 29 Jan 2008 12:38:25 GMT\r\n<br>Connection: Keep-Alive\r\n<br>Content-Length: 302\r\n<br>\r\n<br>1,Taro,taro@hoge.com,Kawasaki<br>2,Hanako,hanako@foo.com,Fukuoka |
| MESSAGE CONTROL INFORMATION | TRANSFER DESTINATION SERVER — 10.10.10.1<br>CONVERSION RULE — AtoCVS.xsl<br>REQUESTING SOURCE NODE — 10.10.0.254 (MESSAGE RELAY APPARATUS 5a) |

FIG.23

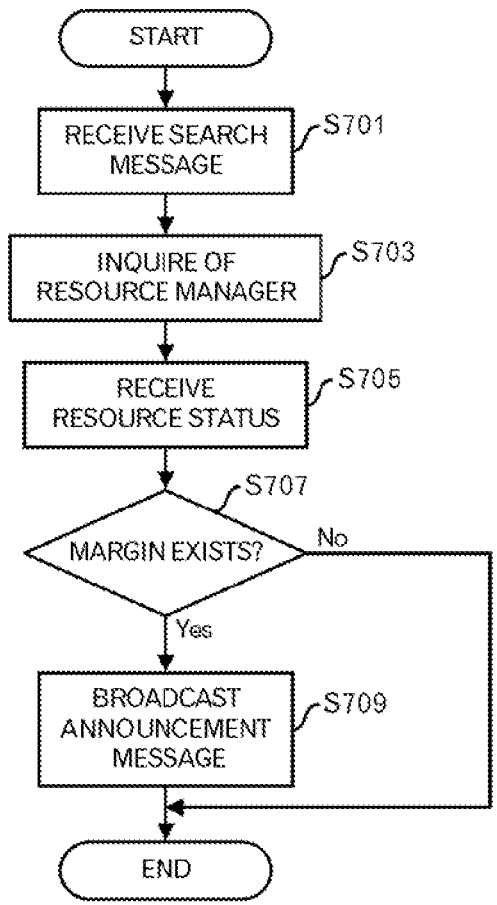

FIG.24

| RESOURCE USE | APPROVAL | |
|---|---|---|
| CONVERSION MESSAGE | HTTP/1.1 /service/A1\r\n<br>Cookie:<br>JSESSIONID=55D95DFFF39788A6729C2F74018AA23C\r\n<br>Content-Type: text/html;charset=ISO-8859-1\r\n<br>Date: Tue, 29 Jan 2008 12:38:25 GMT\r\n<br>Connection: Keep-Alive\r\n<br>Content-Length: 302\r\n<br>\r\n | |
| | 1,Taro,taro@hoge.com,Kawasaki<br>2,Hanako,hanako@foo.com,Fukuoka | |
| MESSAGE CONTROL INFORMATION | TRANSFER DESTINATION SERVER | 10.10.10.1 |
| | CONVERSION RULE | AtoCVS.xsl |
| | REQUEST SOURCE NODE | 10.10.0.254<br>(MESSAGE RELAY APPARATUS 5a) |

FIG.27

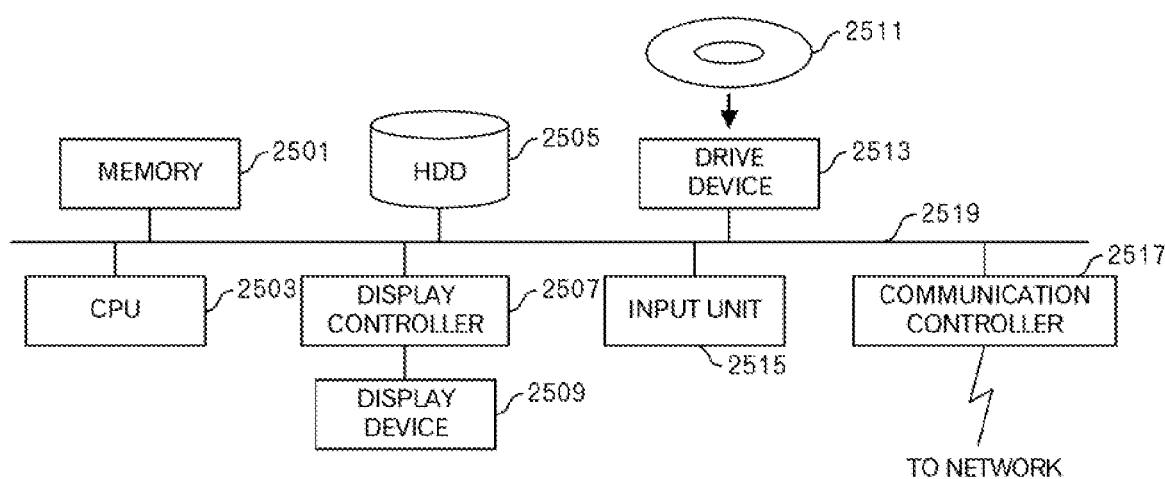

FIG.32

MESSAGE RELAY APPARATUS AND METHOD

CROSS-REFERENCE TO RELATED APPLICATIONS

This application is based upon and claims the benefit of priority of the prior Japanese Patent Application No. 2012-062097, filed on Mar. 19, 2012, the entire contents of which are incorporated herein by reference.

FIELD

This technique relates to a relay technique of messages with data conversion.

BACKGROUND

Recently, in a corporate Information Technology (IT) system or data center, it is becoming general to utilize extensible Markup Language (XML) messages, for example, in Simple Object Access Protocol (SOAP) for data communication between applications.

In such a system, when the applications process XML messages in the same format, there is no problem, and when XML messages in different formats are processed, either application may be changed, or a message relay apparatus for converting messages may be provided between the applications.

Here, when the latter is selected, the message relay apparatus typically includes a dedicated arithmetic unit (e.g. XML accelerator) for accelerating speed of a conversion processing of the messages, and the dedicated arithmetic unit executes the XML conversion processing, and a general-purpose processor executes a transfer processing.

However, the processing load of the XML conversion processing tends to be high, and in a large-scale system, there is a possibility that the message relay apparatus becomes a bottleneck. Therefore, by introducing a Layer-4 switch (L4SW) and plural message relay apparatuses to perform the load balancing of the message relay apparatuses, it tries to improve the throughput of the overall system.

At this time, because the load balancing in the Layer-4 switch is carried out based on the load of the general-purpose processor in the message relay apparatus, the balance of the loads for the dedicated arithmetic units is not considered. Therefore, a problem that the throughput of the overall system becomes lower may occur. More specifically, because contents of the XML conversion depend on the messages, inefficiency may occur when a lot of messages whose load of the XML conversion processing is little are allocated to one message relay apparatus, and reversely, when a lot of messages whose load of the XML conversion processing is large are allocated to one message relay apparatus.

In other words, when messages in different formats are converted and relayed by a message relay apparatus, the throughput in the overall system may become low in the conventional system.

SUMMARY

A message relay apparatus according to an aspect of this technique includes: (A) a receiver that receives a message to be transferred; (B) a determination unit that determines whether or not the message relay apparatus can afford to perform a conversion processing, before performing the conversion processing for the message; (C) a selection unit that selects another apparatus to which the conversion processing is requested based on stored information representing other apparatuses that can afford to perform the conversion processing, when the message relay apparatus cannot afford to perform the conversion processing; (D) a requesting unit that requests the selected another apparatus to perform the conversion processing for the message, and receives the converted message from the selected another apparatus; and (E) a transmission unit that transmits the received and converted message to a transfer destination.

The object and advantages of the embodiment will be realized and attained by means of the elements and combinations particularly pointed out in the claims.

It is to be understood that both the foregoing general description and the following detailed description are exemplary and explanatory and are not restrictive of the embodiment as claimed.

BRIEF DESCRIPTION OF DRAWINGS

FIG. 6 is a diagram depicting an example of a confirmation message;

FIG. 7 is a diagram depicting an example of a response message;

FIG. 9 is a diagram depicting an example of a deletion message;

FIG. 11 is a diagram depicting an example of data stored in a transfer destination storage unit;

FIG. 20 is a diagram depicting an example of a conversion request message;

FIG. 23 is a diagram depicting an example of a conversion result message;

FIG. 24 is a diagram depicting an example of a processing flow executed by the selection unit and communication unit in the first embodiment;

FIG. 27 is a diagram depicting an example of a response message (approval) in the second embodiment;

FIG. 32 is a functional block diagram of a computer.

DESCRIPTION OF EMBODIMENTS

[Embodiment 1]

Figure 1:
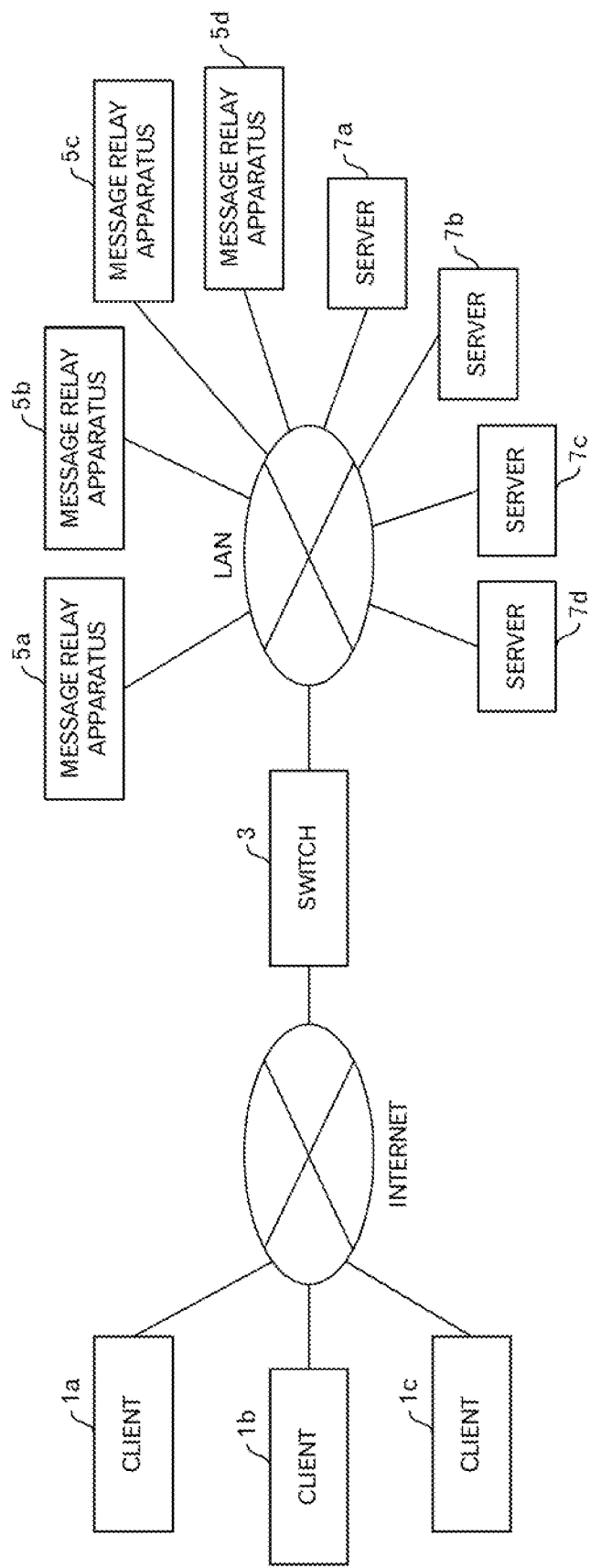
FIG. 1 is a diagram illustrating an example of a network configuration between apparatuses transferring XML messages.

FIG. 1 illustrates an example of a network configuration between apparatuses that transfer XML messages. In this example, clients 1 (1a to 1c in this figure) and a switch 3 (e.g. L4SW (Layer-4 switch)) are connected through the internet. Furthermore, the switch 3, massage relay apparatuses 5 (5a to 5d in this figure) and servers 7 (7a to 7d in this figure) are connected through a Local Area Network (LAN). The servers 7 are servers that provide application services for the clients 1, for example. In this example, it is assumed that each of the servers 7 processes the XML messages in different formats.

Next, a first example of a sequence in this embodiment will be explained using FIG. 2. The client 1 transmits a request message to a server 7a (step (1)). Because a path between the client 1 and the server 7 is virtualized through the switch 3 and message relay apparatus 5, the request message is received initially by the switch 3. The switch 3 selects one of the message relay apparatuses 5, and transfers the request message to the selected message relay apparatus 5 (step (2)). In this example, the switch 3 selects the message relay apparatus 5a. The switch 3 selects any one of the message relay apparatuses 5, for example, according to the processing states of the respective message relay apparatuses 5. The switch 3 selects a message relay apparatus 5 having a margin in the processing performance of the general-purpose processor, for example. Therefore, the switch 3 may acquire information on the processing states from the message relay apparatuses 5 (e.g. an operation ratio of the general-purpose processor, usage ratio of the memory and/or like).

Here, data conversion of the request message will be explained, shortly. The message relay apparatus 5 that received the transferred request message converts the received request message to a message in a format, with which the server 7 of the transfer destination can deal, and transfers the converted request message to the server 7. At that time, when the message relay apparatus 5 has no margin in the processing capability to perform the data conversion by itself, the message relay apparatus 5 requests another message relay apparatus 5 to carry out the data conversion.

In this embodiment, in order to select another massage relay apparatus 5 that is a request destination, each of the message relay apparatuses 5 contains information regarding other message relay apparatuses 5 having the processing capability enough for the data conversion. Then, based on this information, the message relay apparatus 5 selects another message relay apparatus 5 having a margin in the processing capability for the data conversion, and requests the selected message relay apparatus 5 to conduct the data conversion of the message.

Figure 2:
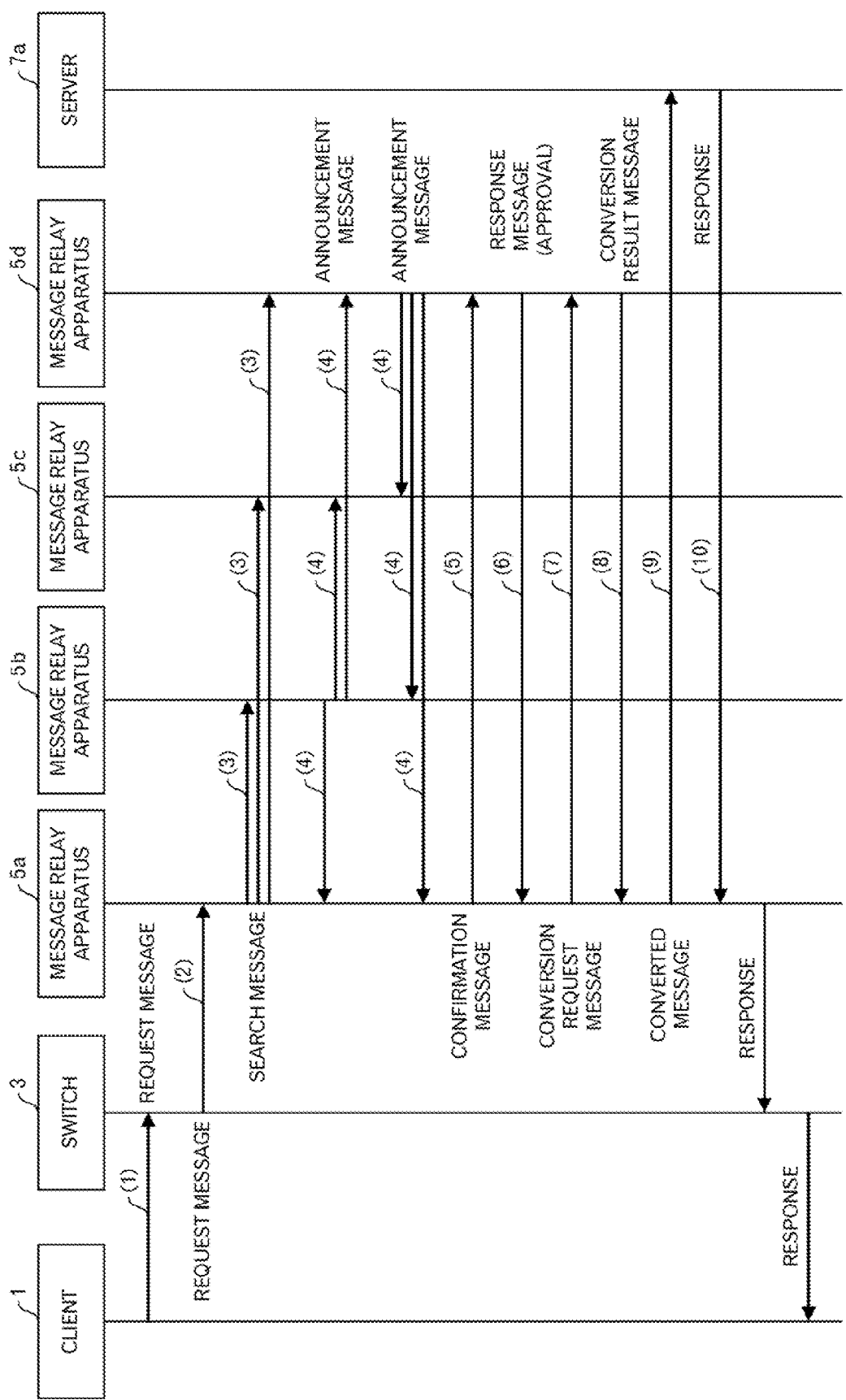
FIG. 2 is a diagram depicting a first example of a sequence in a first embodiment.

Returning to the explanation of the sequence example in FIG. 2, the message relay apparatus 5a that received the request message determines that there is no room in the processing capability for the data conversion in itself. Furthermore, now, the message relay apparatus 5a does not contains information concerning other message relay apparatuses 5 having the processing capability enough for the data conversion. Then, in order to search other message relay apparatuses 5 having a margin in the processing capability for the data conversion, the message relay apparatus 5a broadcasts messages (hereinafter, a search message) to other message relay apparatuses 5b, 5c and 5d (step (2)).

The message relay apparatuses 5 that received the search message (in this example, the message relay apparatuses 5b, 5c and 5d) respectively determine whether or not there is room in the processing capability for the data conversion in itself. Then, when it is determined that there is room in the processing capability for the data conversion in itself, each of the message relay apparatuses 5b, 5c and 5d broadcast a message to announce that there is room in the processing capability for the data conversion in itself (hereinafter, referred to announcement message), to the message relay apparatuses 5 other than itself (step (4)). In the example of FIG. 2, the massage relay apparatus 5b determines that there is room in the processing capability for the data conversion in itself, and broadcasts the announcement message to the message relay apparatuses 5a, 5c and 5d. Moreover, the message relay apparatus 5d also determines that there is room in the processing capability for the data conversion in itself, and broadcasts the announcement message to the message relay apparatuses 5a, 5b and 5c. On the other hand, the message relay apparatus 5c determines that there is no room in the processing capability for the data conversion in itself, and does not broadcast the announcement message.

The message relay apparatus 5 that received the announcement message identifies a message relay apparatus 5 that is a transmission source of the announcement message, and holds information on the identified message relay apparatus 5 as the information on other message relay apparatuses 5 having the processing capability enough for the data conversion. For example, in response to the broadcast of the announcement message from the message relay apparatus 5b, the message relay apparatuses 5a, 5c and 5d respectively add the information on the message relay apparatus 5b to the information on other message relay apparatuses 5 having the processing capability enough for the data conversion. Furthermore, in response to the broadcast of the announcement message from the message relay apparatus 5d, the message relay apparatuses 5a, 5b and 5c respectively add the information on the message relay apparatus 5d to the information on other message relay apparatuses 5 having the processing capability enough for the data conversion.

Thus, the message relay apparatus 5a that obtained the information concerning other message relay apparatuses 5 having the processing capability enough for the data conversion selects a message relay apparatus 5 that is a candidate of a request destination or the data conversion. When the information contained in the message relay apparatus 5 includes plural message relay apparatuses 5 having the processing capability enough for the data conversion, any one of the message relay apparatuses 5 is selected. In this example, the message relay apparatus 5a selects the message relay apparatus 5d that is a candidate of a request destination of the data conversion for the message from among the message relay apparatuses 5b and 5d that are included in the information.

Then, before requesting the data conversion of the message, the message relay apparatus 5a transmits a message for confirming whether or not the request for the data conversion of the message is approved or refused (hereinafter, referred to a confirmation message to the message relay apparatus 5d that is a candidate (step (5)).

The message relay apparatus 5d that received the confirmation message determines whether or not there is room in the processing capability for the data conversion in itself, again. In this sequence example, the message relay apparatus 5d determines that there is room in the processing capability for the data conversion, and transmits a response message representing the approval to the message relay apparatus 5a that is a transmission source of the confirmation message (step (6)).

Then, when the message relay apparatus 5a receives the response message representing the approval, the message relay apparatus 5a transmits a conversion request message to request data conversion to the message relay apparatus 5d that has approved (step (7)). The conversion request message includes an original message that is a conversion target and control information for the original message.

The message relay apparatus 5d that received the conversion request message carries out data conversion of the original message included in the received conversion request message, and transmits a conversion result message to the message relay apparatus 5a that is a transmission source of the conversion request message (step (8)). The conversion result message includes the converted message that is the conversion result and the control information of the converted message.

The message relay apparatus 5a that received the conversion result message extracts the converted message included in the received conversion result message, and transmits the extracted converted message to the server 7a that is a transfer destination (step (9)).

The server 7a that received the converted message operates so as to carry out its own service processing for the received message, similarly to a processing executed when the normal request message would be received. Moreover, the server 7a transmits a response to the client 1 (step (10)). The transmitted response is transferred to the client 1 through the message relay apparatus 5a and the swatch 3 along the virtualized path or route.

Figures 3, 4, 5:
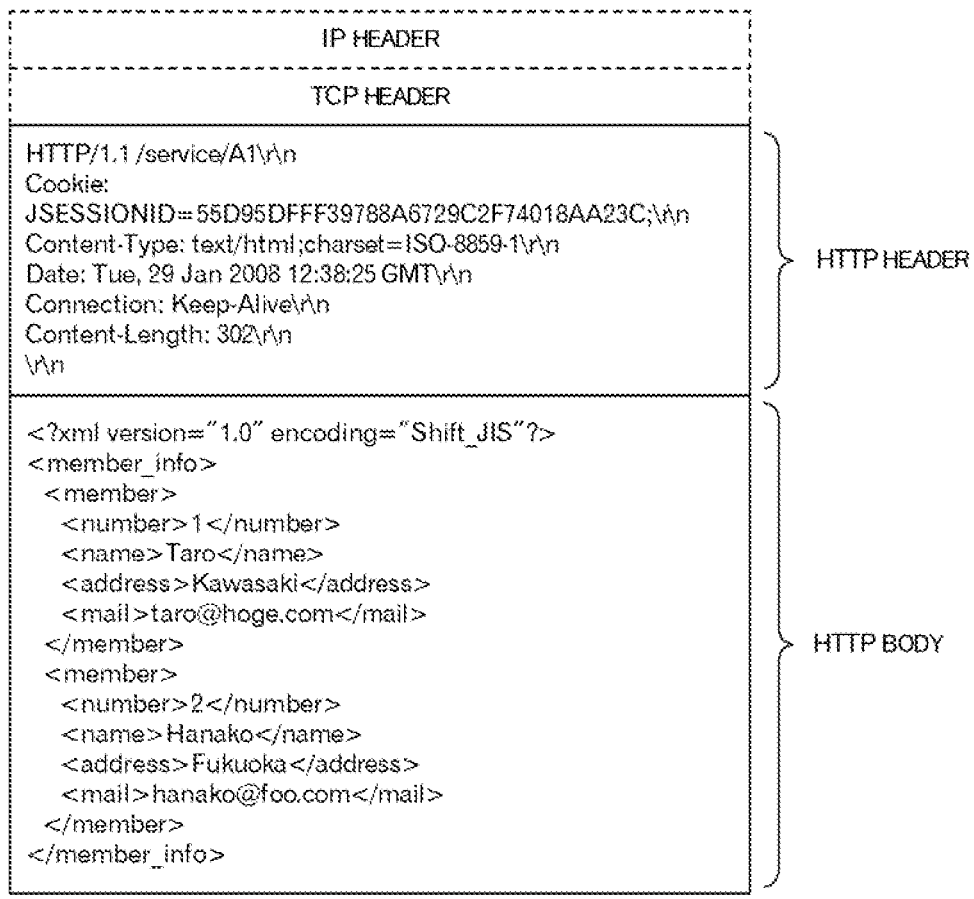
FIG. 3 is a diagram depicting an example of a request message.
FIG. 4 is a diagram depicting an example of a search message.
FIG. 5 is a diagram depicting an example of an announcement message.

Here, each message transferred in the aforementioned sequence will be explained. FIG. 3 illustrates an example of the request message. The request message includes an Internet Protocol (IP) header, a Transmission Control Protocol (TCP) header, a Hyper Test Transfer Protocol (HTTP) header and a HTTP body. The HTTP header includes a request Uniform Resource Identifier (URI). In this example, the request URI is represented as "/SERVICE/A1". Moreover, the HTTP body is described in a format of XML.

Next, FIG. 4 illustrates an example of a search message. The search message includes, as a message type, information to identify that this as a search message. Furthermore, the search message includes information to identify a node that is a transmission source of the search message. In this example, an address of the message relay apparatus 5a is included.

Next, FIG. 5 illustrates an example of an announcement message. The announcement message includes as a message type, information to identify that this is an announcement message. Furthermore, the announcement message includes information to identify a node that is a transmission source of the announcement message. In this example, an address of the message relay apparatus 5b is included.

Furthermore, FIG. 6 illustrates an example of a confirmation message. The confirmation message includes, as a message type, information to identify that this is a confirmation message. Furthermore, the confirmation message includes information to identify a requesting source node that transmits the confirmation message. In this example, an address of the message relay apparatus 5a is included. Moreover, the confirmation message includes information to identify a candidate node that would receive the confirmation message. In this example, an address of the message relay apparatus 5b is included.

Next, FIG. 7 illustrates an example of a response message. The response message includes, as a message type, information to identify that this is a response message. Furthermore, the response message includes information to identify a requesting source node that transmitted the confirmation message, which caused the response message to be transmitted. In this example, an address of the message relay apparatus 5a is included. Moreover, the response message includes information to identify a candidate node of the confirmation message, which caused the response message to be transmitted. In this example, an address of the message relay apparatus 5b is included. In addition, the response message also includes information to represent whether it is approved or rejected (or refused) to utilize the candidate node as the resource for the data conversion processing.

Figure 8:
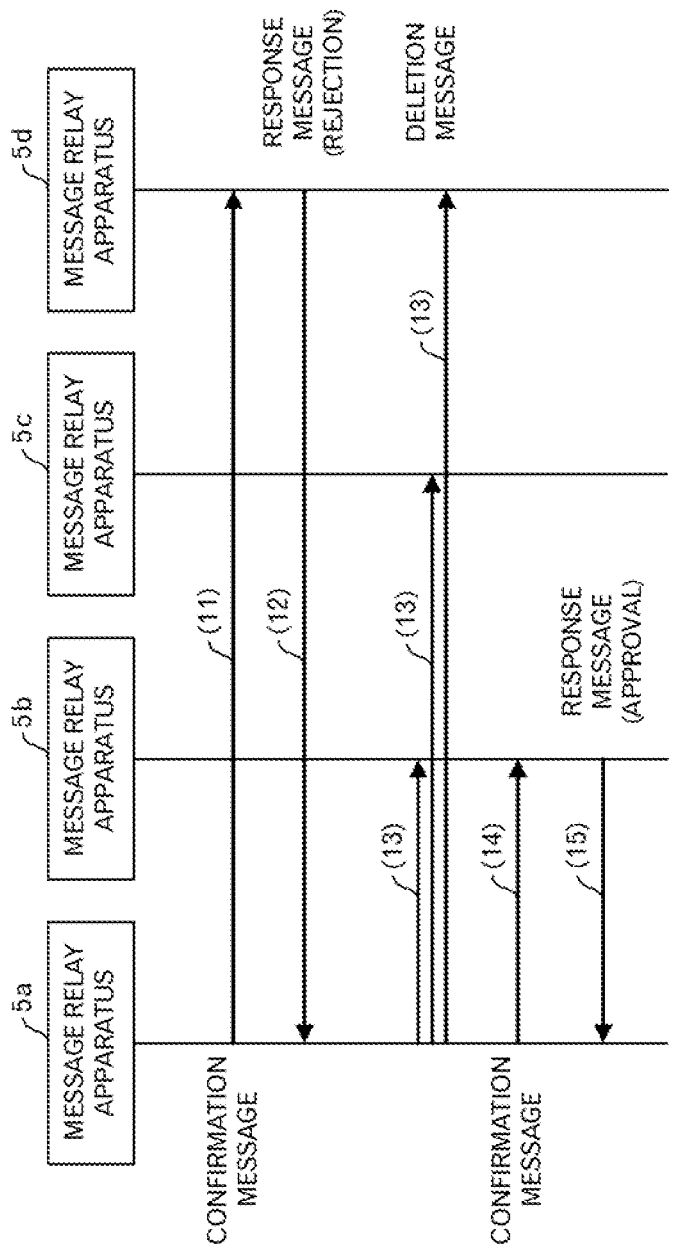
FIG. 8 is a diagram depicting a second example of a sequence in the first embodiment.

Then, a case is assumed that the message relay apparatus 5 that transmitted the announcement message loses a processing capability for the data conversion after that. FIG. 8 illustrates a second sequence example in the first embodiment. This example represents a sequence in which the candidate node determines that it has no margin in the processing capability for the data conversion, and the candidate node rejects that it is used as resources for the data conversion of the message.

The message relay apparatus 5a selects as the candidate to which the data conversion is requested, the message relay apparatus 5d, similarly to the first sequence example. The operations of the steps (1) to (4) illustrated in FIG. 2 are similar to those in the first sequence example, so the explanation is omitted.

Then, the message relay apparatus 5a transmits a confirmation message to confirm whether the request for the data conversion of the message is allowed or refused to the message relay apparatus 5d that is a candidate, before requesting the data conversion of the message (step (11)).

The message relay apparatus 5d that received the confirmation message determines whether there is room in the processing capability for the data conversion in itself again. In this sequence example, the message relay apparatus 5d determines that there is no room in the processing capability for the data conversion, and transmits the response message representing the rejection to the message relay apparatus 5a that is a transmission source of the confirmation message (step (12)).

Then, when the message relay apparatus 5a receives the response massage representing the rejection, the message relay apparatus 5a deletes information of the message relay apparatus 3d that is a transmission source of the response message representing the rejection, from information on other message relay apparatuses 5 having the processing capability enough for the data conversion. Furthermore, the message relay apparatus 5a broadcasts a message representing the information on the message relay apparatus 5d has been deleted from the information on other message relay apparatuses 5 having the processing capability enough for the data conversion (hereinafter, referred to deletion message) (step (13)). The deletion message means that it prompts other message relay apparatuses 5 to delete the information on the message relay apparatus 5 identified by the deletion message from the information on other message relay apparatuses 5 having the processing capability enough for the data conversion, which was held by other message relay apparatuses 5.

The message relay apparatus 5 that received the deletion message deletes information on the message relay apparatus 5 identified by the deletion message from the information on other message relay apparatuses 5 having the processing capability enough for the data conversion in itself. In this example, the message relay apparatuses 5b and 5c that received the deletion message delete the information on the message relay apparatus 5d. The message relay apparatus 5d does not carry out any particular processing, because this deletion message is for itself.

Then, the message relay apparatus 5a selects the message relay apparatus 5b as a candidate to which the data conversion is requested, again, and transmits a confirmation message to the message relay apparatus 5b (step (14)). The message relay apparatus 5b determines that there is room in the processing capability for the data conversion at the present in itself, and transmits a response message representing the approval to the message relay apparatus 5a (step (15)). In the subsequent sequence, the message relay apparatus 5b operates as being similar to that of the message relay apparatus 5d in the first example illustrated in FIG. 2.

FIG. 9 illustrates an example of the deletion message. The deletion message includes as a message type, information to identify that this is a deletion message. Furthermore, the deletion message includes information to identify a transmission source node of the deletion message. In this example, an address of the message relay apparatus 5a is included. Moreover, the deletion message includes information to identify the message relay apparatus 5 to be deleted. In this example, an address of the message relay apparatus 5d is included.

Figure 10:
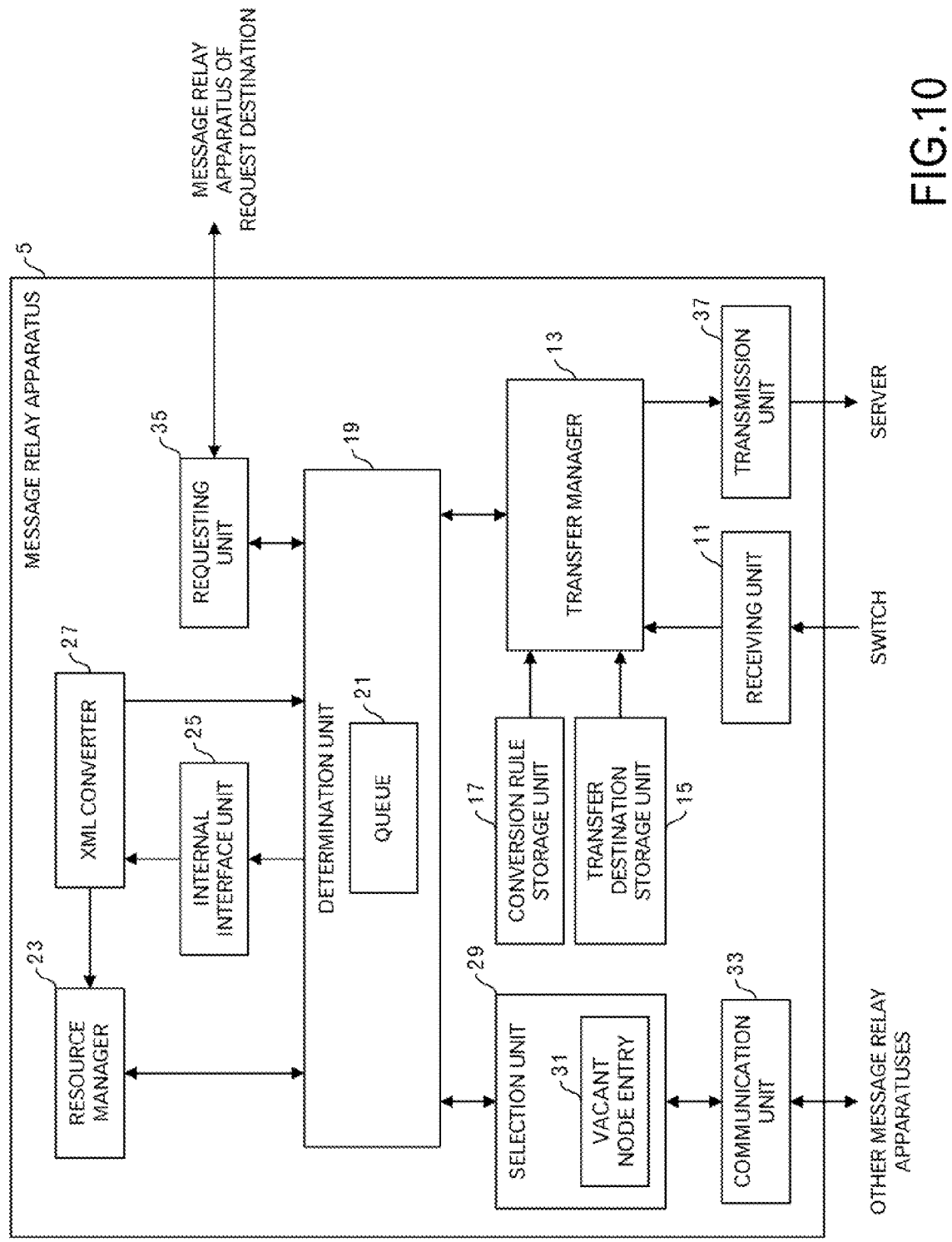
FIG. 10 is a diagram depicting a configuration example of a message relay apparatus in the first embodiment.

Next, the aforementioned message relay apparatus 5 will be explained. FIG. 10 illustrates a configuration example of the message relay apparatus 5 in the first embodiment. For example, the message relay apparatus 5 includes a receiving unit 11, a transfer manager 13, a transfer destination storage unit 15, a conversion rule storage unit 17, a determination unit 19, a queue 21, a resource manager 23, an internal interface unit 25, an XML converter 27, a selection unit 29, a vacant node entry 31, a communication unit 33, a requesting unit 35 and a transmission unit 37.

The receiving unit 11 receives the request message from the switch 3, for example.

The transfer manager 13 identifies a transfer destination sever of the received request message and a conversion rule to generate a conversion request. The conversion request includes an original message to be converted and control information of the original message. Moreover, the transfer manager 13 receives a conversion result from the determination unit 19 in response to the generated conversion request, and causes the transmission unit 37 to transmit the conversion result to the server 7 that is a transfer destination.

The transfer destination storage unit 15 stores information to identify the transfer destination. FIG. 11 is a diagram depicting an example of data stored in the transfer destination storage unit 15. In the transfer destination, storage unit 15, a record is provided for each request URI, and in each record, correlation between the request URI and an address of a transfer destination server is stored.

Figures 12, 13, 15, 19:
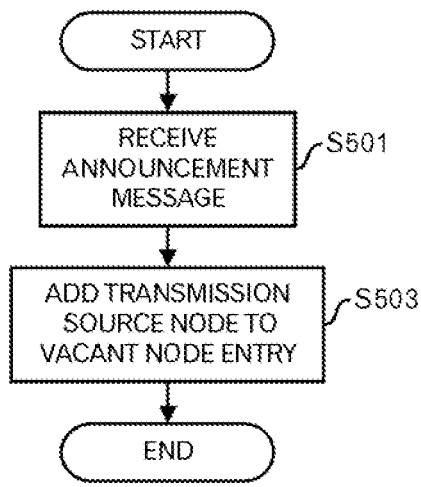
FIG. 12 is a diagram depicting an example of data stored in a conversion rule storage unit.
FIG. 13 is a diagram depicting an example of a vacant node entry.
FIG. 15 is a diagram depicting an example of message control information.
FIG. 19 is a diagram depicting an example of a processing flow executed by the selection unit and communication unit in the first embodiment.

The conversion rule storage unit 17 stores information to identify a rule when performing data conversion of the message. FIG. 12 illustrates a diagram of an example of data stored in the conversion rule storage unit 17. In the conversion rule storage unit 17, a record is provided for each request URI, and in each record, information to identify the conversion rule (e.g. a name of a software used for the conversion or identification information of a conversion algorithm) is stored in association with the request URI.

Returning to the explanation of FIG. 10, the determination unit 19 controls a processing from receiving the conversion request from the transfer manager 13 to returning the conversion result to the transfer manager 13.

The queue 21 is a data storage area used for the internal control of the determination unit 19. Specifically, the queue 12 is used to temporarily store the unprocessed conversion request. However, the queue 21 may be provided outside the determination unit 19.

The resource manager 23 measures or obtains the operation status of the XML converter 27. Information on the resource status is used to determine whether or not there is room in the processing capability for the data conversion in itself.

The internal interface unit 25 receives the conversion request from the determination unit 19 when its own apparatus executes the data conversion. Then, the internal interface unit 25 transfers the received conversion request to the XML converter 27.

The XML converter 27 carries out the data conversion of the message according to the conversion request received by the internal interface unit 25. In this example, the XML converter 27 converts the original message included in the conversion request according to the conversion rule to generate the converted message. The generated converted message is included in the conversion result. It is assumed that the XML converter 27 performs a processing by a dedicated arithmetic unit such as an XML accelerator.

The selection unit 23 selects another message relay apparatus 5 having a margin in the processing capability for the data conversion. In this embodiment, the message relay apparatus 5 is called "node". Moreover, the selection unit 29 controls transmission and reception of the search messages, announcement messages, confirmation messages, response messages and deletion messages.

The vacant node entry 31 is an area to store information on the message relay apparatuses 5 having the processing capability enough tor the data conversion. FIG. 13 illustrates an example of a vacant node entry. In this embodiment, the message relay apparatus 5 having the processing capability enough for the data conversion is called "vacant node". In FIG. 13, an address of the message relay apparatus 5b and an address of the message relay apparatus 5d are stored.

Returning to the explanation of FIG. 10, the communication unit 33 communicates the search messages, announcement messages, confirmation messages, response messages and deletion messages with other message relay apparatuses 5.

The requesting unit 35 requests other message relay apparatuses 5 to carry out the data conversion of the messages, and receives the conversion result from other requested message relay apparatuses 5. Furthermore, the requesting unit 35 returns the received conversion result to the determination unit 19.

The transmission unit 37 transmits the converted message to the server 7 that is a transfer destination, for example.

Figure 14:
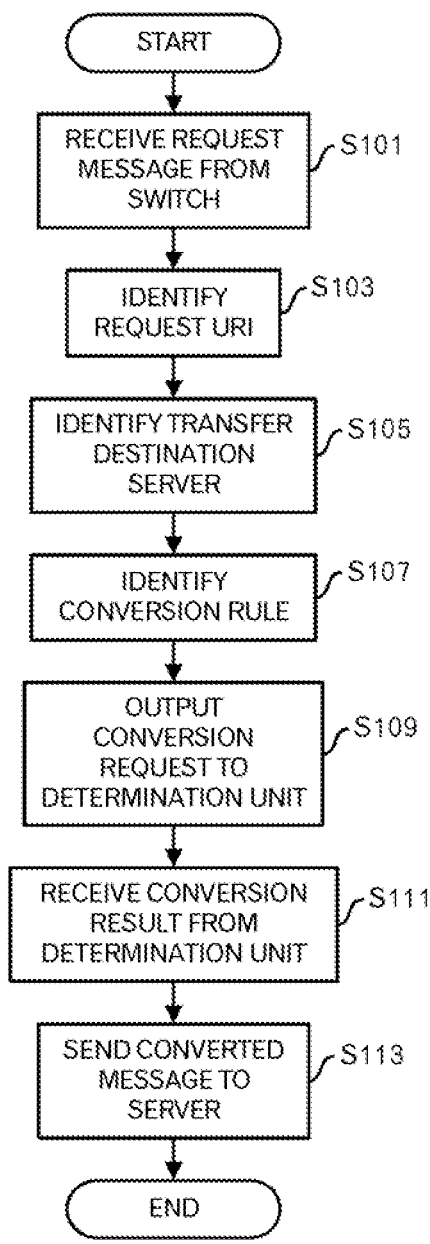
FIG. 14 is a diagram depicting an example of a processing flow executed by a receiving unit, transfer manager and transmission unit in the first embodiment.

Next, specific processing contents of each processing unit will be explained. First, the processing contents of the receiving unit 11, transfer manager 13 and transmission unit 37 will be explained. FIG. 14 illustrates an example of a processing flow executed by the receiving unit 11, transfer manager 13 and transmission unit 37 in the first embodiment.

When the receiving unit 11 receives a request message from the switch 3, the receiving unit 11 outputs the received request message to the transfer manager 13 (S101). When the transfer manager 13 receives the request message, the transfer manager 13 firstly searches an HTTP header of the request message for a code of a request URI to identify the request URI (S103). Next, the transfer manager 13 refers to the transfer destination storage unit 15 to identify a transfer destination server corresponding to the request URI (S105). Furthermore, the transfer manager 13 refers to the conversion rule storage unit 17 to identify a conversion rule corresponding to the request URI (S107).

Then, the transfer manager 13 outputs a conversion request to the determination unit 19 (S109). The conversion request includes the original message to be converted and control information for the original message. In this example, the original message to be converted is the request message. The control information of the message includes identification information of a conversion rule and identification information of the identified transfer destination server. FIG. 15 illustrates an example of the message control information. At this point of time, the requesting source node may not be set.

Returning to the explanation of FIG. 14, when the operation of the determination unit 13 is completed, the transfer manager 13 receives the conversion result including the message control information from the determination unit 13 (S111). Then, the transfer manager 13 outputs the conversion result including the message control information to the transmission unit 37, and the transmission unit 37 transmits the converted message included in the conversion result to the transfer destination server 7 identified by the message control information (S113).

Figure 16:
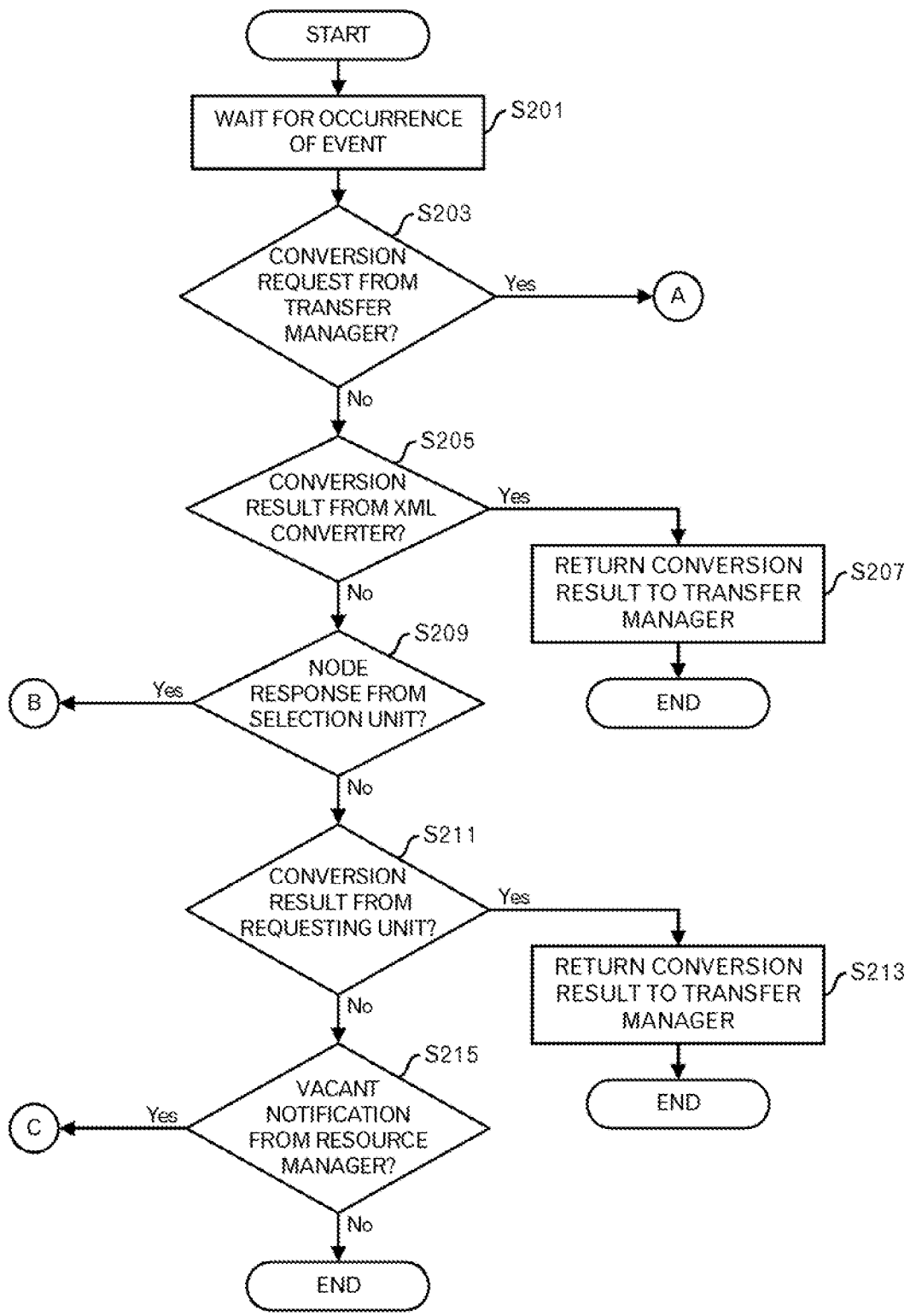
FIG. 16 is a diagram depicting an example of a processing flow executed by a determination unit in the first embodiment.
Figure 17:
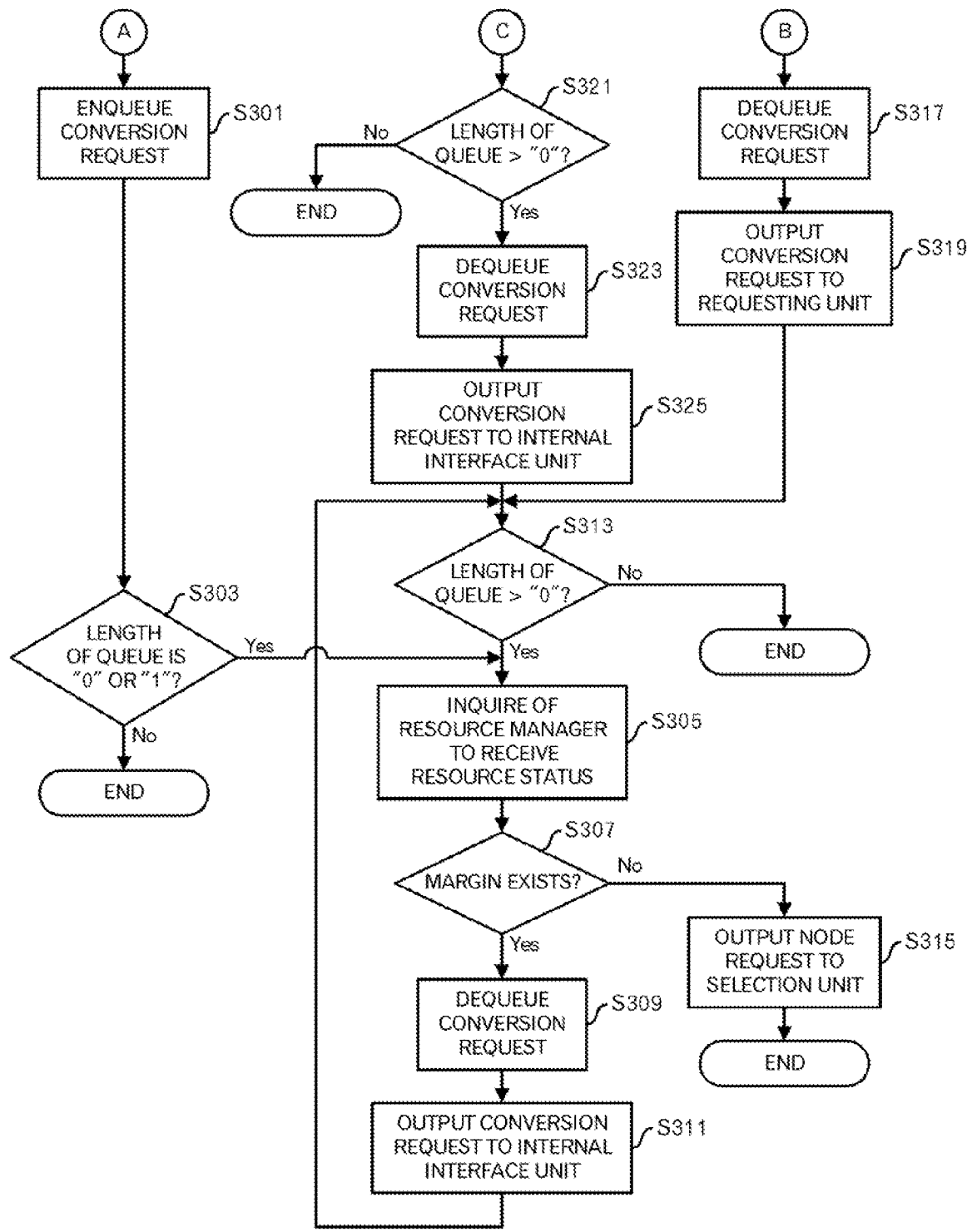
FIG. 17 is a diagram depicting an example of a processing flow executed by the determination unit in the first embodiment.

Next, processing contents of the determination unit 19 will be explained. FIGS. 16 and 17 are diagrams illustrating a processing flow executed by the determination unit 19 in the first embodiment. The determination unit 19 waits for an occurrence of an event (S201). When an event occurs, the processing of the determination unit 19 branches out according to the type of the event that occurred at this time (S203, S205, S209, S211, S215).

The determination unit 19 determines whether or not the event that occurred at S201 is the conversion request from the transfer manager 13 (S203). When the determination unit 19 determines that the event that occurred at S201 is the conversion request from the transfer manager 13, the processing proceeds to S301 in FIG. 17 through a terminal A.

Shifting to the explanation of the processing in FIG. 17, the determination unit 19 enqueues the conversion request into the queue 21 (S301). In other words, the determination unit 19 temporarily holds the unprocessed conversion request. Then, the determination unit 19 determines whether or not the length of the queue 21 changes from "0" to "1" (S303). When the determination unit 19 determines that the length of the queue 21 changes from "0" to "1", the processing proceeds to S305. On the other hand, when the determination unit 19 does not determine that the length of the queue 21 changes from "0" to "1", the processing ends. For example, when the length of the queue 21 changes from "1" to "2", there is one unprocessed conversion request to be processed beforehand in the queue 21, so the determination unit 19 has already begun the processing. On the other hand, when the length of the queue 21 changes from "0" to "1", there is no unprocessed conversion request to foe processed beforehand in the queue 21, so the determination unit 19 performs the processing for the conversion request received as the event.

The determination unit 19 inquires the resource status of the resource manager 23 to obtain the data on the resource status at S305. The resource status represents the operation status or the XML converter 27. For example, when the XML converter 27 conducts the processing by the XML accelerator, the resource status may include an operating rate of an arithmetic unit included in the XML accelerator, a usage ratio of a memory used by the arithmetic unit included in the XML accelerator or a time required for the processing executed by the arithmetic unit included in the XML accelerator. Then, the resource manager 23 measures the operation status of the XML converter 27 or directly obtains the operation status from the XML converter 27.

The determination unit 19 determines whether or not the XML converter 27 has the processing capability enough for the data conversion (S307). For example, when the operating rate of the aforementioned arithmetic unit, usage ratio of the memory, the time required for the processing executed by the arithmetic unit or the like exceeds a threshold, the determination unit 19 determines that there is no room in the processing capability for the data conversion, and when either of them does not exceed the threshold, the determination unit 19 determines that there is room for the data conversion.

When the determination unit 19 determines at S307 that there is room in the processing capability for the data conversion in itself, the determination unit 19 dequeues the conversion request from the queue 21 (S309). Thus, the determination unit 19 fetches an unprocessed conversion request, which is temporarily held. In such a case, the conversion request that was enqueued in the queue 21 at S301 is fetched. Then, the determination unit 19 outputs the conversion request to the internal interface unit 25 (S311). After that, the determination unit 19 determines whether or not the length of the queue 21 is longer than "0" (S313). When the determination unit 19 determines that the length of the queue 21 is longer than "0", the processing proceeds to S305. This is because there is another unprocessed conversion request. On the other hand, when the determination unit 19 determines that the length of the queue 21 is not longer than "0", the processing ends. This is because there is no unprocessed conversion request in the queue 21.

On the other hand, when the determination unit 19 determines that there is no room in the processing capability for the data conversion in itself, the determination unit 19 outputs a node request to the selection unit 29 (S315). The node request is a command for causing the selection unit 29 to carry out a processing to select another message relay apparatus 5 to which the data conversion is requested. Then, the determination unit 19 temporarily ends the processing. The determination unit 19 restarts the subsequent processing until a node response from the selection unit 29 is received. The restart of the processing is performed from S209 in FIG. 16.

Returning to the explanation of the processing in FIG 16, the determination unit 19 determines whether or not the event that occurred at S201 is the conversion result from the XML converter 27 (S205). This event corresponds to a response to the conversion request outputted to the internal interface unit 25 at S311 in FIG. 17. When the determination unit 19 determines that the event that occurred at S201 corresponds to the conversion result from the XML converter 27, the determination unit 19 returns the conversion result to the transfer manager 13 (S207).

Figure 18:
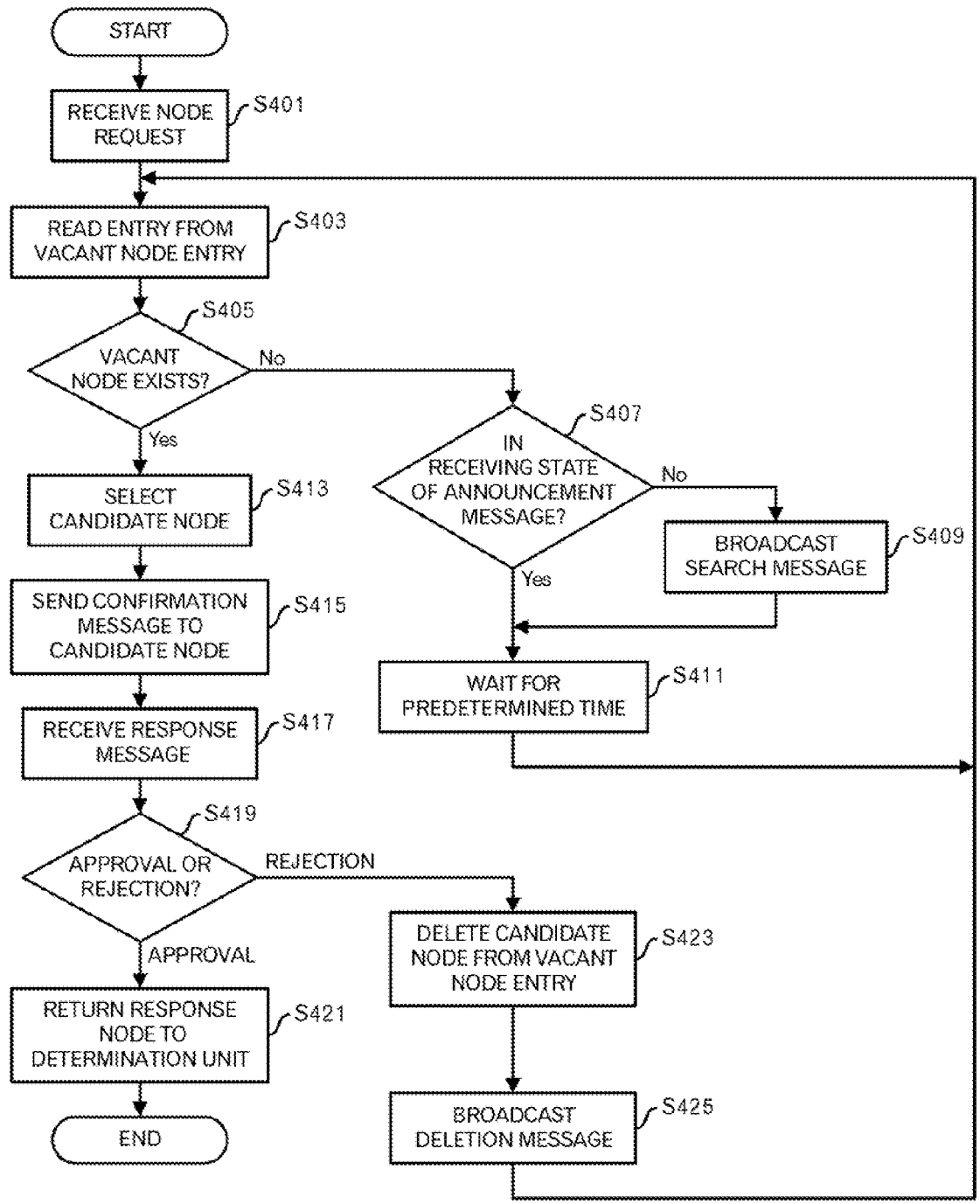
FIG. 18 is a diagram depicting an example of a processing flow executed by a selection unit and communication unit in the first embodiment.

Next, processing contents of the selection unit 29 and communication unit 33 will be explained. FIG. 18 illustrates a processing flow executed by the selection unit 29 and communication unit 33 in the first embodiment. When the selection unit 29 receives a node request from the determination unit 19 (S401), the selection unit 29 reads the vacant node entry 31 (S403). Then, the selection unit 29 determines whether or not there is a vacant node (S405). When the selection unit 29 determines that there is no vacant node, the selection unit 29 determines whether or not the communication unit 33 is in a receiving state of the announcement message (S407). When the selection unit 29 determines that the communication unit 33 is not in the receiving state of the announcement message, the selection unit 29 controls the communication unit 33 to broadcast a search message, and the communication unit 33 broadcasts the search message (S409). At this time, the communication unit 33 sets its own address of the message relay apparatus 5 as the address of the transmission source node in the search message. Then, the selection unit 29 waits for a predetermined time (S411), then the processing returns to S403.

The selection unit 29 and communication unit 33 execute a process to receive the announcement message in parallel with a process of the processing flow in FIG. 18. The processing flow of the process to receive the announcement message will be explained using FIG. 19. When the communication unit 33 receives the announcement message and outputs the announcement message to the selection unit 29 (S501), the selection unit 29 identifies a message relay apparatus 5 (i.e. transmission source node) that is a transmission source of the announcement message, and adds the identified message relay apparatus 5 (i.e. transmission source node) to the vacant node entry 31 (S503). Then, the selection unit 29 ends the processing.

Returning to the explanation of the processing in FIG. 18, the selection unit 29 reads the vacant node entry 31 again (S403). While the communication unit 33 receives the announcement message, the selection unit 29 determines that there is no vacant node (S405), so the processing returns to S407 again. Then, when the selection unit 29 determines at S407 that the communication unit 33 is in the receiving state of the announcement message, the selection unit 29 waits for the predetermined time again (S411), and the processing returns to S403.

When the receipt of the announcement message by the communication unit 33 is completed, the selection unit 29 determines at S405 that there is a vacant node, and selects a candidate node to which the data conversion processing of the message is requested (S413). Specifically, the selection unit 29 selects the vacant node identified in the vacant node entry 31 as the candidate node. When there are plural vacant nodes, the selection unit 29 selects any one of the vacant nodes as the candidate node.

Then, the selection unit 29 controls the communication unit 33 to generate a confirmation message, and the communication unit 33 generates the confirmation message to transmit the generated confirmation message to the candidate node (S415). At this time, the communication unit 33 sets, as the address of the requesting source node in the confirmation message, its own address of the message relay apparatus 5. Furthermore, the communication unit 33 sets the address of the candidate node to the confirmation message.

Then, the communication unit 33 receives a response message returned from the candidate node as a response to the confirmation message transmitted at S415, and transfers the received response message to the selection unit 29 (S417). The selection unit 29 that received the response message determines whether the transferred response message includes the approval or rejection (S419). When the selection unit 29 determines that the response message includes the approval, the selection unit 29 identifies the candidate node as the response node, and returns an identifier or address of the identified response node to the determination unit 19 (S421).

On the other hand, when the selection unit 29 determines at S419 that the response message includes the rejection, the selection unit 29 deletes the address of the candidate node that returned the response message representing the rejection from the vacant node entry 31 (S423), and broadcasts a deletion message (S425). At this time, the communication unit 33 sets as the address of the transmission source node, its own address of the message relay apparatus 5 in the deletion message. Furthermore, the communication unit 33 sets as the address of the node to be deleted, the address of the candidate node in the deletion message. Then, the selection unit 29 continues the processing from S403.

Returning to the explanation of the processing in FIG. 16, the determination unit 19 determines whether or not the event that occurred at S201 is a node response from the selection unit 29 (S209). This event is a response to the node request outputted at S315 in FIG. 17 from the determination unit 19 to the selection unit 29. When the determination unit 19 determines that the event that occurred at S201 is the node response from the selection unit 29, the processing proceeds to S317 in FIG. 17 through a terminal B. The node response includes information on the message relay apparatus 5 to which the data conversion will be requested.

Then, the determination unit 19 dequeues the conversion request from the queue 21 (S317). Then, the determination unit 19 outputs the conversion request to the requesting unit 35 (S319). At this time, the determination unit 19 sets, as the requesting source node, information on its own message relay apparatus 5 (its own node), into the message control information of the conversion request. The requesting unit 35 transmits the received conversion request as a message to the message relay apparatus 5 that is the request destination. FIG. 20 illustrates an example of a conversion request message. The conversion request message includes the message control information of the original message in addition to the original message to be converted.

Then, the determination unit 19 continues the processing for another conversion request after shifting the processing to S313.

Returning to the explanation of the processing in FIG. 16, the determination unit 19 determines whether or not the event that occurred at S201 is the conversion result from the requesting unit 35 (S211). This event corresponds to a response to the conversion request outputted at S319 in FIG. 17 from the determination unit 19 to the requesting unit 35. when the determination unit 19 determines that the event that occurred at S201 corresponds to the conversion result from the requesting unit 35, the determination unit 19 returns the conversion result to the transfer manager 13 (S213).

When the resource manager 23 determines in its own right that there is room in the operation status of the XML converter 27, the resource manager 23 may voluntarily output vacant notification representing there is room for the data conversion to the determination unit 19. In such a case, the determination unit 19 determines at S215 in FIG. 16 whether or not the event that occurred at S201 corresponds to the vacant notification from the resource manager 23. When the determination unit 19 determines that the event that occurred at S201 corresponds to the vacant notification from the resource manager 23, the processing shifts to S321 in FIG. 17 through a terminal C.

Shifting to the explanation of the processing in FIG. 17, the determination unit 19 determines whether or not the length of the queue 21 is longer than "0" (S321). When the determination unit 19 determines that the length of the queue 21 is not longer than "0", the processing ends. This is because the queue 21 does not hold any unprocessed conversion request, when the determination unit 19 determines that the length of the queue 21 is longer than "0", the determination unit 19 dequeues the conversion request from the queue 21 (S323), and outputs the conversion request to the internal interface unit 25 (S325). At this time, there is an unprocessed conversion request in the queue 21, and the XML converter 27 has the processing capability enough for the data conversion. Then, the processing returns to the processing of S313. The subsequent processing is the same as the aforementioned processing.

As a result of the aforementioned processing, the operation of the message relay apparatus 5a, which were depicted in FIGS. 2 and 8, is performed. Next, the operations of the message relay apparatuses 5b, 5c and 5d, which were illustrated in FIGS. 2 and 8, will be explained. Specifically, the operations of the message relay apparatus 5 when the conversion request is received, when the search message is received, when the confirmation message is received and when the deletion message is received will be explained.

Figure 21:
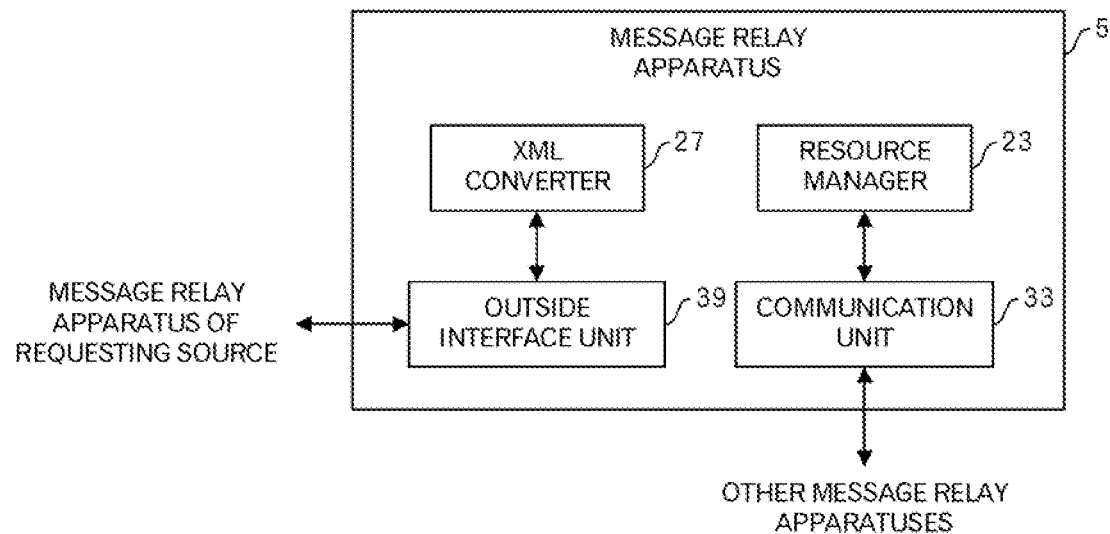
FIG. 21 is a diagram depicting a configuration example of the message relay apparatus in the first embodiment.

In order to carry out these operations, the message relay apparatus 5 has an outside interface unit 39 illustrated in FIG. 21 in addition to the aforementioned elements illustrated in FIG. 10. The outside interface unit 39 receives a conversion request message from the message relay apparatus 5 that is a requesting source, outputs the conversion request to the XML converter 21, waits for the completion of the data conversion for the message by the XML converter 27, and transmits a conversion result message to the message relay apparatus 5 that is the requesting source.

Figure 22:
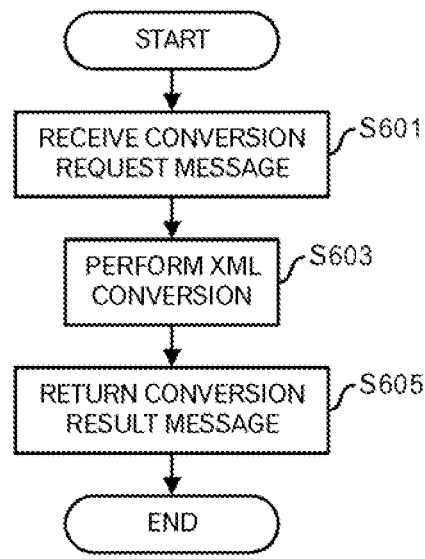
FIG. 22 is a diagram depicting an example of a processing flow executed by an XML converter and outside interface unit.

FIG. 22 illustrates a processing flow executed by the outside interface unit 39 and XML converter 27 when the conversion request is received. When the outside interface unit 39 receives the conversion request message (S601), the outside interface unit 39 outputs the conversion request to the XML converter 27. The XML converter 27 converts the original message included in the received conversion request message according to the conversion rule included in the conversion request message to generate the converted message (3603). The generated converted message is returned to the outside interface unit 39. The outside interface unit 39 returns as a message, the conversion result received from the XML converter 27 to the message relay apparatus 5 that is a transmission source of the conversion request message (S605). At this time, the outside interface unit 39 replaces the original message included in the conversion request message with the converted message to generate a conversion result message. FIG. 23 illustrates an example of the conversion result message.

Next, the operation when the message relay apparatus 5 receives the search message will be explained. FIG. 24 illustrates a processing flow of the operation. When the communication unit 33 receives a search message (S701), the communication unit 33 inquires of the resource manager 23 (S703), and receives resource status from the resource manager 23 (S705). Then, the communication unit 33 determines whether or not the XML converter 27 has the processing capability enough for the data conversion (S107). When the communication unit 33 determines that the XML converter 27 has the processing capability enough for the data conversion, the communication unit 33 broadcasts an announcement message (S709). Thus, the communication unit 33 sets as the address of the transmission source node of the announcement message, the its own address of the message relay apparatus 5. On the other hand, when the communication unit 33 determines that there is no room in the processing capability for the data conversion, and the processing ends.

Figure 25:
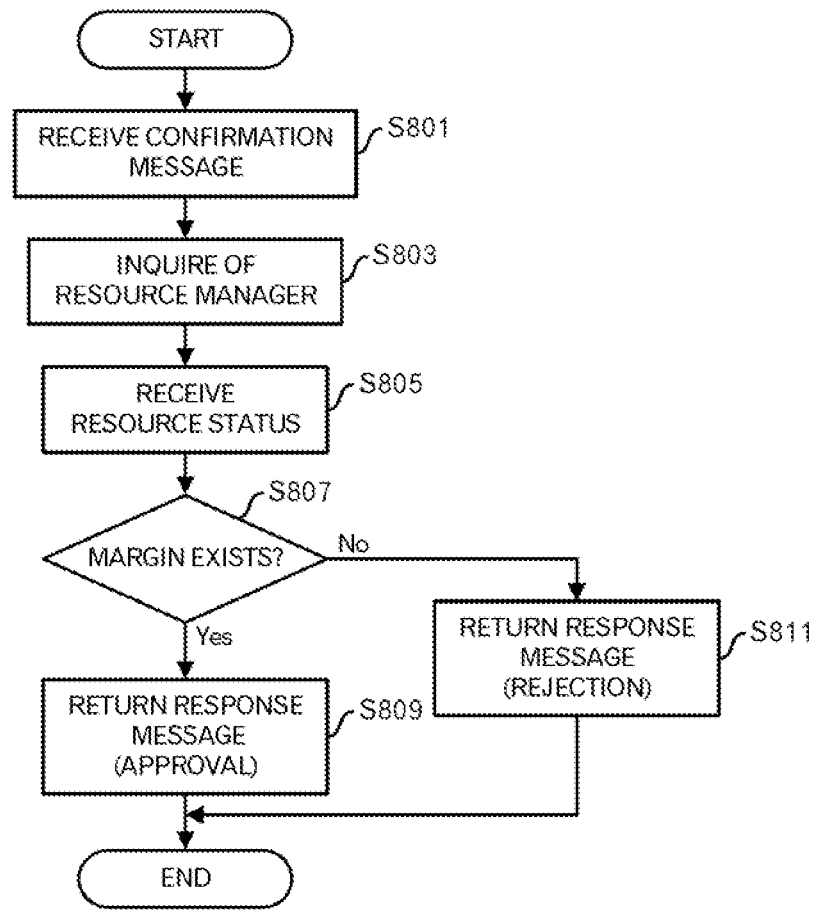
FIG. 25 is a diagram depicting an example of a processing flow executed by the selection unit and communication unit in the first embodiment.

Next, the operation when the message relay apparatus 5 receives the confirmation message will be explained. FIG. 25 illustrates a processing flow when the confirmation message is received. When the communication unit 33 receives the confirmation message (S801), the communication unit 33 inquires of the resource manager 23 (S803), and receives the resource status from the resource manager 23 (S805). Then, the communication unit 33 determines whether or not the XML converter 27 has the processing capability enough for the data conversion (S807). When the communication unit 33 determines that the XML converter 27 has the processing capability enough for the data conversion, the communication unit 33 returns a response message representing the approval to the message relay apparatus 5 that is the transmission source of the confirmation message (S809). Thus, the communication unit 33 sets as addresses of the requesting source node and candidate node, the same addresses as those of the confirmation message, in the response message, are further sets information representing the use of the resource is approved in the response message.

On the other hand, when the communication unit 33 determines at S807 that the XML converter 27 does not have the processing capability enough for the data conversion, the communication unit 33 returns the response message representing the rejection to the message relay apparatus 5 that is the transmission source of the confirmation message (S811). Thus, the communication unit 33 sets as addresses of the requesting source node and candidate node, the same addresses as those of the confirmation message in the response message, and further sets information representing that the resource use is rejected or refused in the response message.

Finally, the operation when the message relay apparatus 5 received the deletion message will be explained. When the communication unit 33 receives the deletion message, the communication unit 33 outputs the deletion message to the selection unit 29, and the selection unit 29 identifies a node to be deleted, which is included in the deletion message, and deletes information on the identified node to be deleted from the vacant node entry 31.

As described above, the message relay apparatus in this embodiment manages other message relay apparatuses having a margin in the processing capability for the data conversion for the message in the vacant node entry, and selects a request destination of the data conversion for the message based on the vacant node entry, and the message relay apparatus that is the request destination carries out the data conversion for the message. Therefore, the message relay apparatuses share the resources for the data conversion for the message each other, and it becomes possible to effectively use the resources for the data conversion for the message.

Thus, the possibility that the request of the data conversion for the message is successful becomes high, and if is possible to shorten the time required for the resource discovery. Furthermore, by using the broadcast, the number of transferred messages used to synchronise the vacant node entry is suppressed.

The switch performs the load distribution in view of the resources of the transfer processing (e.g. general-purpose processor). However, according to this embodiment, it is possible to resolve inefficiency of the resource utilization in the data conversion for the message, which cannot be resolved by the load distribution. Therefore, even when high load is required for the data conversion for the message, it is possible to completely use the resource for the data conversion for the message among all of the message relay apparatuses.

Furthermore, by adding the message relay apparatus and/or increasing the capability of the XML converter, it is possible to simply and effectively enhance the throughput of the overall system including the message relay apparatuses.

Moreover, because the message relay apparatus receives an announcement message, and adds an address of the message relay apparatus that is the transmission source of the received announcement message to the vacant node entry, the message relay apparatus can easily and certainly identify the resource of the message relay apparatus that can afford to perform the processing of the data conversion for the message.

Furthermore, because the message relay apparatus broadcasts the search message, and receives the announcement message as a response to the broadcast search message, it becomes possible to detect, from a broad range of the message relay apparatuses, the resource for the data conversion for the message, which is effective when other resources for the data conversion for the message are required.

Furthermore, because the message relay apparatus broadcasts the announcement message to one search message, it is possible to reduce the number of messages for the inquiries and responses.

In addition, because the message relay apparatus transmits a confirmation message to another message relay apparatus that is a candidate node in advance, and receives the response message to the confirmation message, it is possible to confirm the present status of the resource of the message relay apparatus that is a request destination before actually requesting the data conversion for the message to another message relay apparatus. In other words, it is possible to prevent the useless requests and the delay of the processing, and to suppress an increase in the amount of the communication.

Moreover, when the response message from another relay apparatus that is the candidate node represents the rejection, the message relay apparatus deletes an identifier or address of the message relay apparatus from the vacant node entry. Therefore, it is possible to prevent beforehand from selecting the message relay apparatus having no margin in the processing capability and failing the request again, by excluding the message relay apparatus having no margin in the processing capability for the data conversion for the message from candidates in advance.

Moreover, when the response message from another message relay apparatus that is the candidate node represents the rejection or refusal, the message relay apparatus broadcasts the deletion message representing that message relay apparatus is deleted from the vacant node entry. Therefore, it is possible to inform other message relay apparatuses of the information regarding the message relay apparatus having no margin in the resources for the message conversion at an appropriate timing.

Furthermore, when the deletion message is received from another message relay apparatus, the message relay apparatus removes the message relay apparatus identified from the deletion message from the vacant node entry. Therefore, based on the failure of the request for the message conversion in another message relay apparatus, it is possible to prevent the similar failure in advance.

Moreover, because the message relay apparatus receives a request for the message conversion processing from another message relay apparatus, and performs the requested message conversion processing, and returns the converted message, it is possible to fully use the message conversion resource in its own message relay apparatus.

[Embodiment 2]

In the second embodiment, an example will be explained in which the prior confirmation by the confirmation message is omitted. In the second embodiment, the reduction of the amount of the communication is expected when the message relay apparatus that is the candidate node has the processing capability enough for the data conversion for the message.

Figure 26:
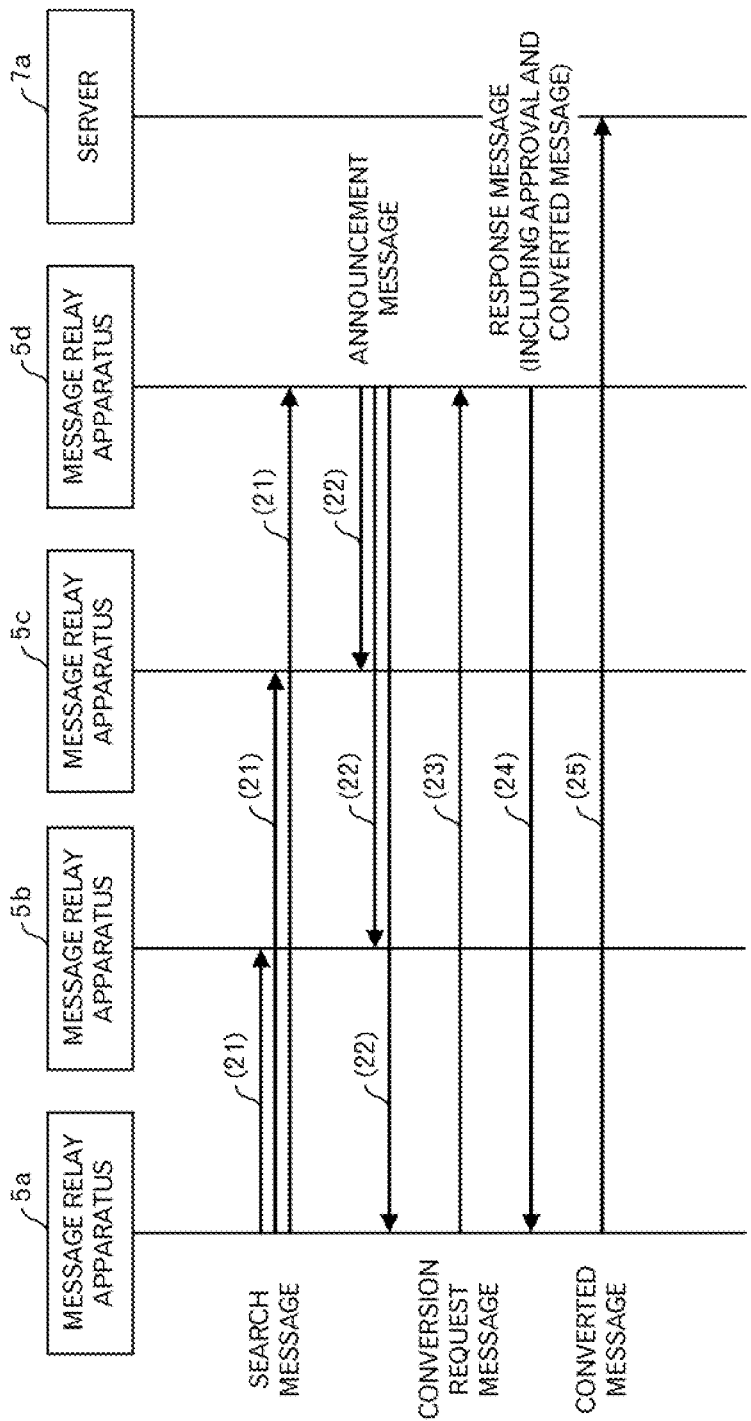
FIG. 26 is a diagram depicting a first example of a sequence in a second embodiment.

FIG. 26 illustrates a first sequence example in the second embodiment. The request message (steps (1) and (2) in FIG. 2) is the same as that in this sequence, and the explanation for the request message is omitted.

Similarly to the first embodiment, the message relay apparatus 5*a* broadcasts a search message (step (21)), and in response to this search message, the message relay apparatus 5*d* broadcasts an announcement message (step (22)).

When the message relay apparatus 5*a* selects a candidate node, similarly to the first embodiment, the message relay apparatus ha directly transmits a conversion request message to the candidate node without transmitting a confirmation message like the first embodiment (step (23)). In this example, the message relay apparatus 5*d* is the candidate node. The message relay apparatus 5*d* has the processing capability enough for the data conversion, and performs the data conversion of the message. Then, the message relay apparatus 5*d* returns the response message including the conversion result and representing the approval (step (24)). FIG. 27 illustrates an example of the response message (approval) transmitted at this time. The response message in the second embodiment has a format in which data representing whether the resource usage is approved or rejected is added to the conversion result message (FIG. 23) in the first embodiment.

In the first sequent embodiment in FIG. 26, a case where the conversion request transmitted to the candidate node is received and the processing smoothly proceeds was explained. However, a case may occurs where the conversion request transmitted to the candidate node is not accepted. Next, a sequence when the conversion request transmitted to the candidate node is rejected will be explained.

Figure 28:
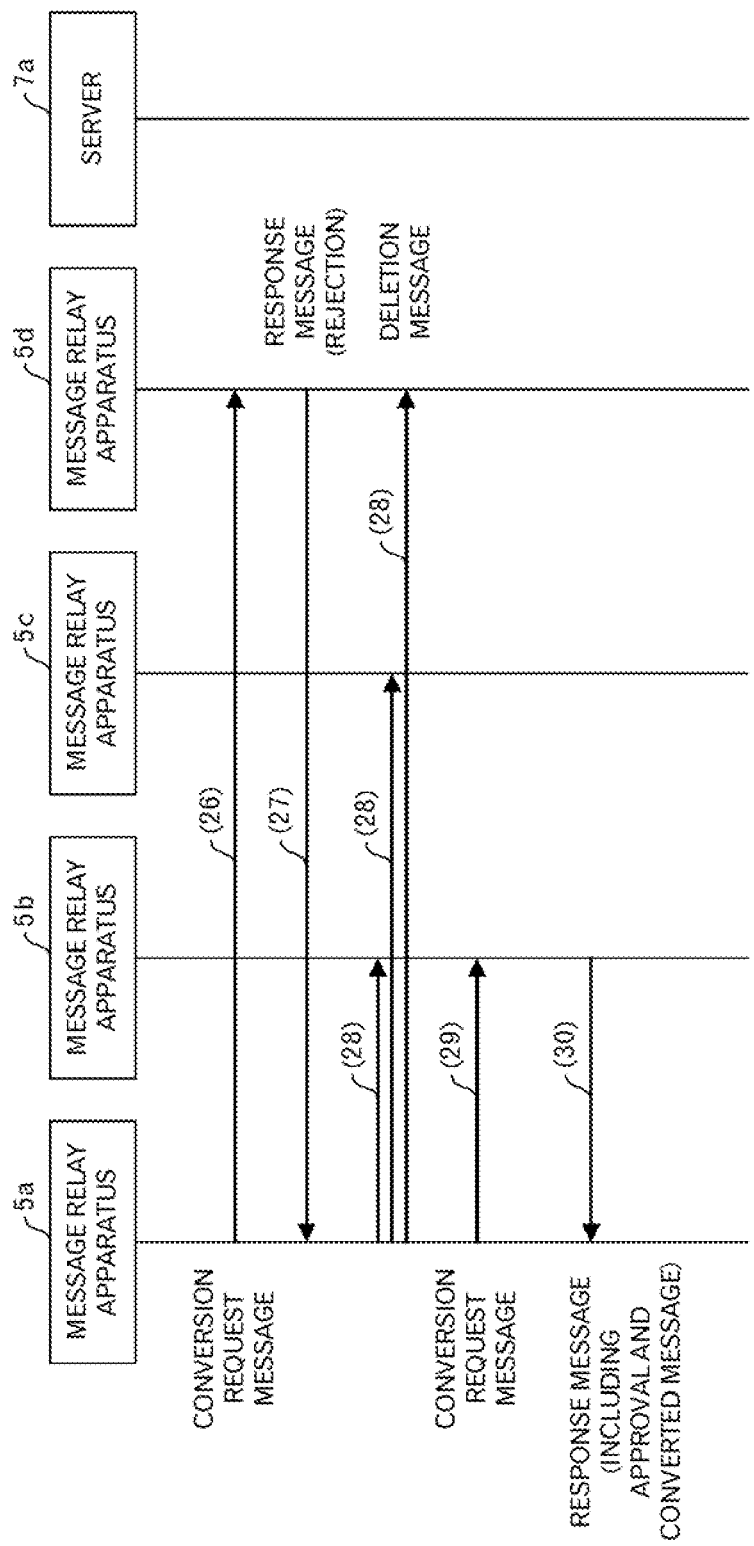
FIG. 28 is a diagram depicting a second example of a sequence in the second embodiment.

FIG. 28 illustrates a second example of a sequence in the second embodiment. In this example, the message relay apparatus 5*a* transmits the conversion request message to the message relay apparatus 5*d* that is a candidate node (step (26)), however, the message relay apparatus 5*d* determines that the message relay apparatus 5*d* has no margin in the processing capability for the data conversion, and returns a response message representing the rejection (step (27)). Data representing the rejection for the resource use is set instead of data representing the approval for the resource use in FIG. 27. At this time, the XML converter 27 does not perform the data conversion, so the region of the converted message is invalid.

The message relay apparatus 5*a* that received the response message representing the rejection broadcasts the deletion message, similarly to the step (13) in FIG. 8 (step (28)), and the message relay apparatus 5*a* selects the message relay apparatus 5*b* as a candidate node again, and transmits the conversion request message to the message relay apparatus 5*b* (step (29)). The message relay apparatus 5*b* carries out the data conversion like the message relay apparatus 5*d* in the first example, and returns the response message representing the approval (step (30)). The subsequent sequence is similar to the steps (9) and (10) in FIG. 2.

Figure 29:
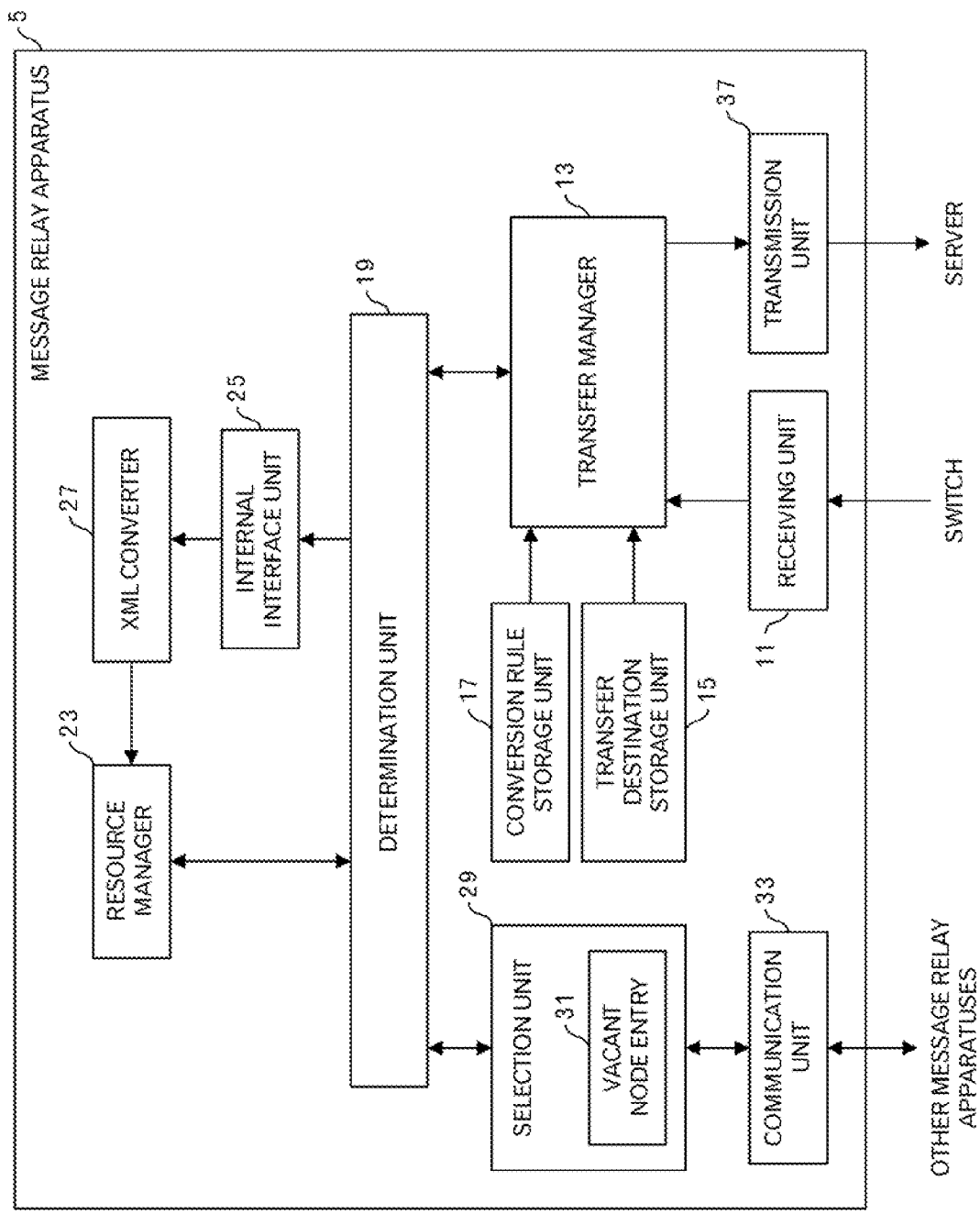
FIG. 29 is a diagram depicting a configuration example of a message relay apparatus in the second embodiment.

Next, the configuration of the message relay apparatus 5 in the second embodiment will be explained. FIG. 29 illustrates a configuration example of the message relay apparatus 5 in the second embodiment. In this example, instead of the requesting unit 35 in the first embodiment, the communication unit 33 transmits the conversion request message and receives the conversion result message. Therefore, the requesting unit 35 in the first embodiment is omitted.

Figure 30:
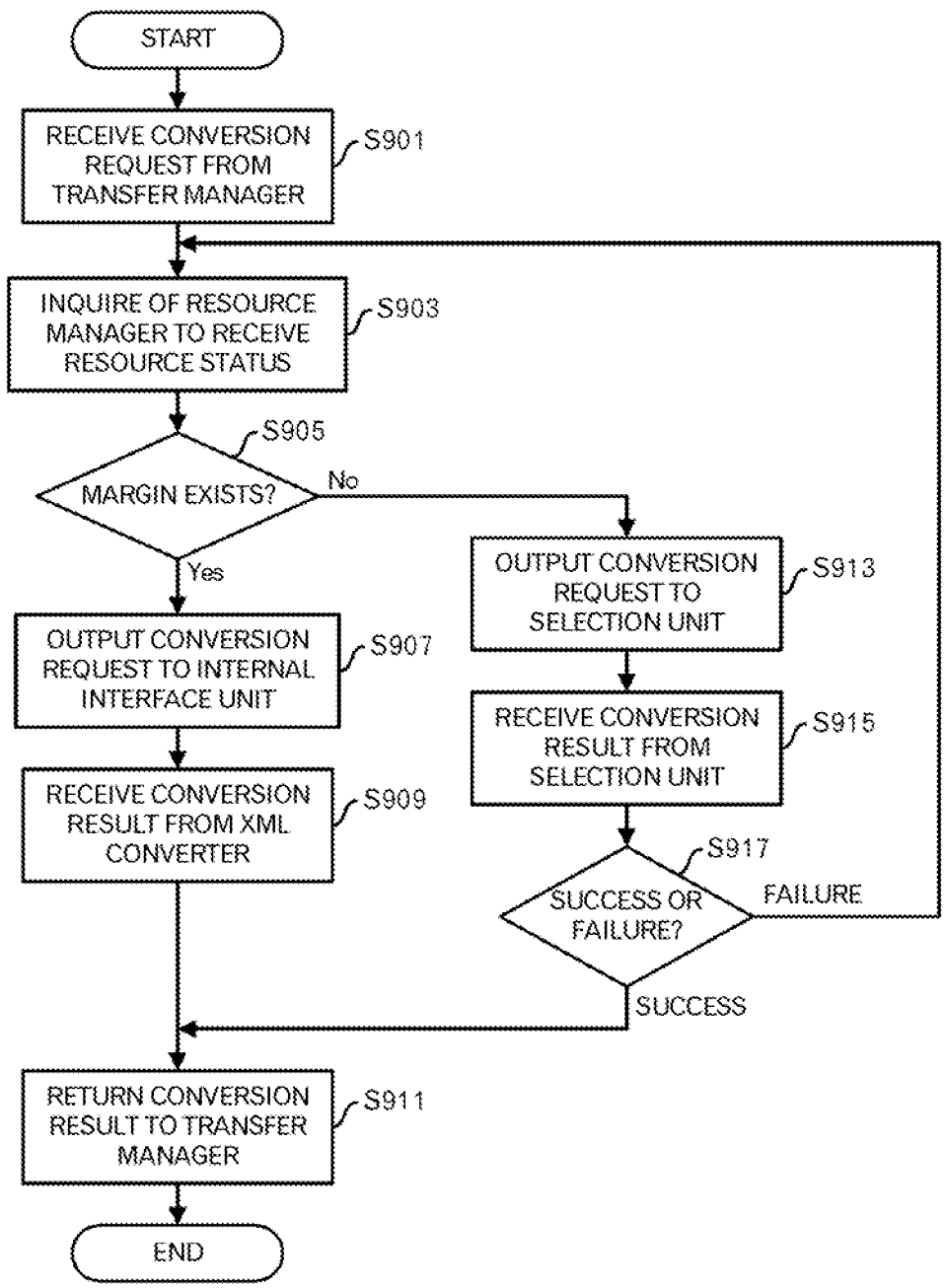
FIG. 30 is a diagram depicting an example of a processing flow executed by a determination unit in the second embodiment.

Based on the aforementioned configuration, the operation of the determination unit 19 in this embodiment will be explained. The determination unit 19 in the second embodiment performs a processing illustrated in FIG. 30 instead of the processing in the first embodiment, which is illustrated in FIGS. 16 and 17.

When the determination unit 19 receives a conversion request from the transfer manager 13, similarly to the first embodiment (S901), the determination unit 19 inquires of the resource manager 23, and receives the resource status (S903). The determination unit 19 determines, based on the resource status, whether or not the XML converter 27 has the processing capability enough for the data conversion (S905). When the determination unit 19 determines at S905 that the XML converter 27 has the processing capability enough for the data conversion, the determination unit 19 outputs a conversion request to the internal interface unit 25 (S907). Then, the determination unit 19 receives the conversion result from the XML converter 27, as a response to the conversion request (S909), and returns the conversion result to the transfer manager 13. Then, the processing ends. The operations of the transfer manager 13 and transmission unit 37 are similar to those in the first embodiment.

On the other hand, when the determination unit 19 determines at S905 that there is no room in the processing capability for the data conversion, the determination unit 19 outputs a conversion request to the selection unit 29 (S913). Then, the determination unit 19 receives the conversion result from the selection unit 29 as the response to the conversion request (S915), and determines whether the conversion result represents the success or failure (S917).

When the determination unit 19 determines that the conversion result represents the success, the determination unit 19 returns the conversion result to the transfer manager 13 (S911), and the processing ends. On the other hand, when the determination unit 19 determines that the conversion result represents the failure, the processing returns to S903. Thus, until the conversion result can be obtained, the aforementioned processing (S903 to S909 and S913 to S917) is repeated.

Figure 31:
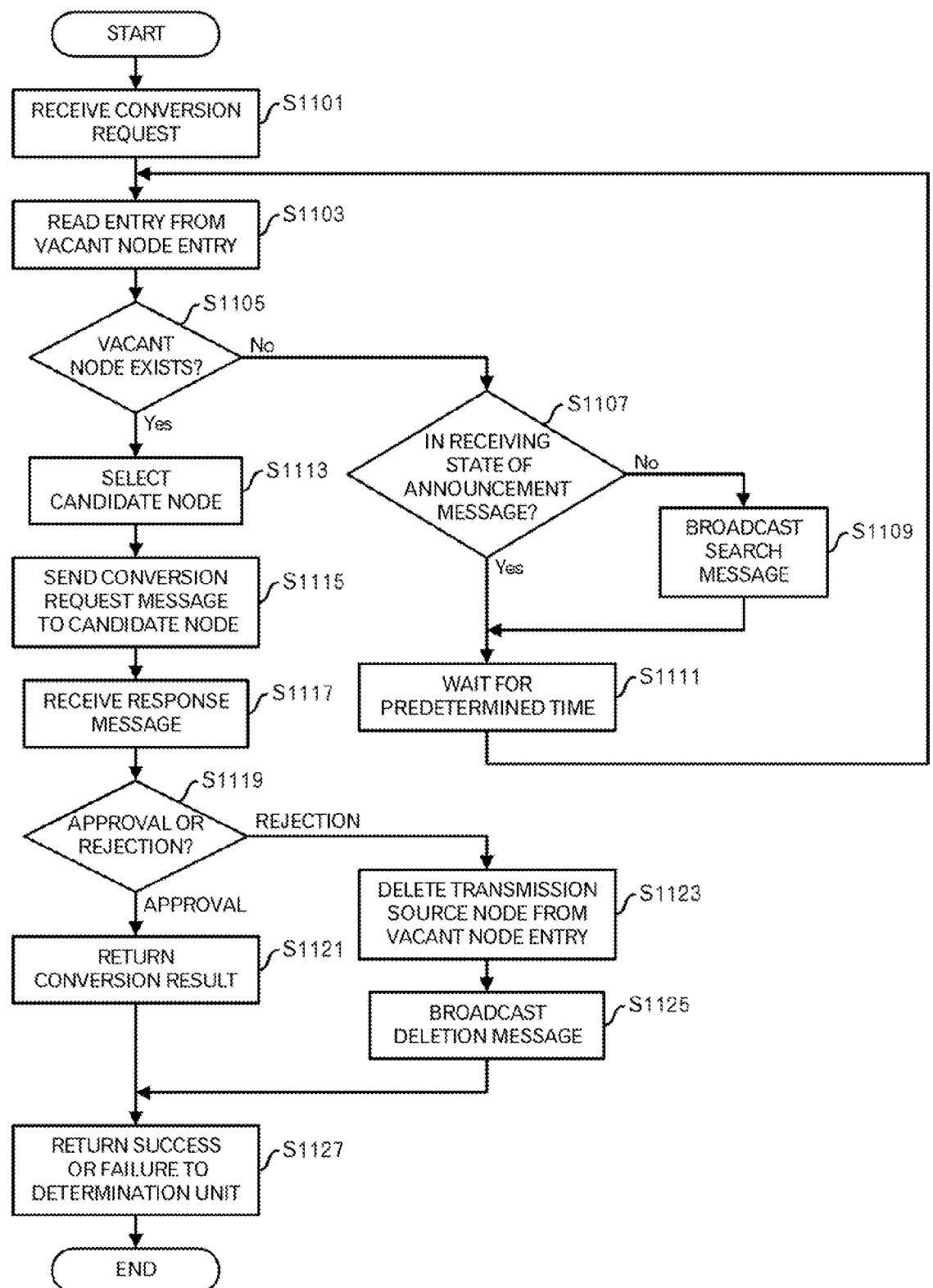
FIG. 31 is a diagram depicting an example of a processing flow executed by a selection unit and communication unit in the second embodiment.

Finally, the processing performed by the selection unit 29 and communication unit 33 in the second embodiment, which is illustrated in FIG. 31, will be explained. When the selection unit 29 receives the conversion request from the determination unit 19 (S1101), the selection unit 29 reads data from the vacant node entry 31 (S1103), and determines whether or not there is a vacant node (S1105). When the selection unit 29 determines that there is no vacant entry, the selection unit 29 determines whether or not the communication unit 33 is in the receiving state of the announcement message (S1107). When the selection unit 29 determines that the communication unit 33 is not in the receiving state of the announcement message, the communication unit 33 broadcasts a search message (S1109). Then, the selection unit 29 waits for a predetermined time (S1111), and the processing returns to S1103. The processing from S1103 to S1111 is similar to the processing from S403 to S411 in FIG. 18.

Next, when the selection unit 29 determines at S1105 that there is a vacant node, the selection unit 29 selects a candidate node (S1113). At this time, the selection unit 29 selects the vacant node as the candidate node. Then, instead of the first embodiment that the communication unit 33 transmits the confirmation message to the selected candidate node, the communication unit 33 immediately transmits the conversion request message to the selected candidate node without transmitting the confirmation message in this embodiment (S1115). The conversion request message is similar to that in the first embodiment (FIG. 20).

Then, the communication unit 33 receives the response message transmitted from the candidate node (S1117). The selection unit 29 receives the response message received by the communication unit 33, and determines whether the response message includes data representing the approval or data representing the rejection (S1119).

When the selection unit 29 determines that the response message includes data representing the approval, the selection unit 29 returns the conversion result to the determination unit 19 (S1121), and further returns data expressing the success to the determination unit 19 (S1121), and the processing ends.

On the other hand, when the selection unit 29 determines that the response message includes data representing the rejection, the selection unit 29 identifies a transmission source node of the response message, and deletes information on the identified transmission source node from the vacant node entry 31 (S1123). Furthermore, in response to an instruction from the selection unit 29, the communication unit 33 broadcasts the deletion message (S1125). The selection unit 29 returns data expressing the failure to the determination unit 19, and the processing ends.

By carrying out the aforementioned processing, the sequence in the second embodiment, which was illustrated in FIGS. 26 and 28, is executed.

The second embodiment is effective in an environment that the request for the resource for the message conversion is easy to be approved, or in a case where the size of the message to be converted is small.

In the environment that the request for the resource for the message conversion is easily to be approved, the possibility that the conversion request message is sent again is low. Therefore, the risk caused by omitting the confirmation message does not easily appear.

Moreover, in a case where the size of the message to be converted is small, even when the conversion request message is resent, the cost for the transfer is few. Therefore, the risk caused by omitting the confirmation message does not easily appear.

Although the embodiments of this technique were explained, this technique is not limited to the embodiments. For example, the aforementioned functional block diagrams do not correspond to program module configurations.

In addition, the aforementioned configurations of the respective storage areas are mere examples, and can be changed. Furthermore, as for the processing flows, as long as the processing results are not changed, the order of steps may be changed, and the steps may be executed in parallel.

Moreover, the functions of the message relay apparatus may be realized by plural computers instead of one computer.

In addition, the aforementioned message relay apparatus is computer devices as illustrated in FIG. 32. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as illustrated in FIG. 32. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform predetermined operations. Moreover, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the application programs systematically cooperate with each other, so that various functions as described above in details are realized.

The embodiments described above are summarized as follows:

A message relay apparatus relating to the embodiments includes: (A) a receiver that receives a message to be transferred; (B) a determination unit that determines whether or not the message relay apparatus can afford to perform a conversion processing, before performing the conversion processing for the message; (C) a selection unit that selects another apparatus to which the conversion processing is requested based on stored information representing other apparatuses that can afford to perform the conversion processing, when the message relay apparatus cannot afford to perform the conversion processing; (D) a requesting unit that requests the selected another apparatus to perform the conversion processing for the message, and receives the converted message from the selected another apparatus; and (E) a transmission unit that transmits the received and converted message to a transfer destination.

Because the message relay apparatus selects another apparatus to which the conversion processing for the message is requested based on information representing other apparatuses having a margin for performing the conversion processing, the possibility that the request for the message conversion succeeds becomes high, and a time to determine the requesting destination can be shortened.

Moreover, the message relay apparatus may further include (F) a communication unit that receives a first message to announce that the message relay apparatus can afford to perform the conversion processing. In such a case, the selection unit may determine that a transmission source of a first message can afford to perform the conversion processing when receiving the first message.

According to this configuration, it is possible to easily and certainly identify another apparatus that can afford to carry out the conversion processing.

Moreover, the communication unit may broadcast a second message to search apparatuses that can afford to perform the conversion processing, and receives the first message as a response to the second message.

Thus, it becomes possible for the message relay apparatus to detect other valid apparatuses when requesting to perform the conversion processing for another apparatus, from a broad range of the message relay apparatuses.

Furthermore, the communication unit may transmit a third message to confirm in advance whether the selected another apparatus approves or rejects a request to perform the conversion processing to the selected another apparatus, and may receive a fourth message as a response to the third message. In such a case, the requesting unit may request the selected another apparatus to perform the conversion processing when the fourth message represents approval.

Thus, before requesting another apparatus to carry out the data conversion for the message, it is possible to confirm the current processing capability of another apparatus that is a requesting destination. Therefore, any useless request does not occur. This prevents the processing delay and suppresses the increase in the amount of the communication.

Moreover, the selection unit may remove information representing a transmission source apparatus of the fourth message from the stored information, when the fourth message represents rejection.

Thus, another apparatus has no margin for performing the message conversion processing is excluded from the candidates in advance. Therefore, it is possible to prevent from carrying out useless processing including selecting as a candidate node another apparatus that has no margin in the processing capability again and falling in the requesting again. Therefore, it is possible to avoid transfer of useless messages.

Moreover, the communication unit may broadcast a deletion message to remove the information representing the transmission source apparatus of the fourth message from the stored information, when the fourth message represents the rejection.

Thus, it is possible to broadly inform the information representing another apparatus that cannot afford to perform the message conversion processing, at an appropriate timing.

Moreover, upon receipt of a deletion message to remove information on a specific apparatus from the stored information, the selection unit may remove the information on the specific apparatus from the stored information.

Thus, based on the failure of the request of the message conversion in another message relay apparatus, it is possible to prevent its own message relay apparatus from similarly failing the processing in advance.

Furthermore, the message relay apparatus may further include: (G) an outside interface unit that receives a request to perform the conversion processing for the message from an outside apparatus; and (H) a data converter that performs the conversion processing for the message. In such a case, the outside interface unit may return a converted message processed by the data converter to the outside apparatus.

Thus, it is possible to use the its own message conversion resource without uselessness.

In addition, the conversion processing may be an XML conversion processing.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A message relay apparatus, comprising:
a receiver that receives a message to be transferred;
a communication unit that receives first data that announces that a transmission source apparatus of the first data can afford to perform a conversion processing, and stores identification information of the transmission source apparatus of the first data in a data storage unit;
a determination unit that determines whether or not the message relay apparatus can afford to perform the conversion processing, before performing the conversion processing for the message;
a selection unit that selects another apparatus that can afford to perform the conversion processing based on the identification information stored in the data storage unit, when the determination unit determined that the message relay apparatus cannot afford to perform the conversion processing;
a requesting unit that requests the selected another apparatus to perform the conversion processing for the message, and receives the converted message from the selected another apparatus; and
a transmission unit that transmits the received and converted message to a transfer destination.

2. The message relay apparatus as set forth in claim 1, wherein the communication unit receives the first data as a response of second data that the message relay apparatus broadcasted to search apparatuses that can afford to perform the conversion processing.

3. The message relay apparatus as set forth in claim 1, wherein the communication unit transmits third data to confirm in advance whether the selected another apparatus approves or rejects a request to perform the conversion processing to the selected another apparatus, and receives fourth data as a response of the third data, and the requesting unit requests the selected another apparatus to perform the conversion processing when the fourth data represents approval.

4. The message relay apparatus as set forth in claim 3, wherein the selection unit removes identification information of a transmission source apparatus of the fourth data from the data storage unit when the fourth data represents rejection.

5. The message relay apparatus as set forth in claim 4, wherein the communication unit broadcasts a deletion message to remove the identification information of the transmission source apparatus of the fourth data, when the fourth data represents the rejection.

6. The message relay apparatus as set forth in claim 1, wherein, upon receipt of a deletion message to remove identification information of a specific apparatus from the data storage unit, the selection unit removes the identification information of the specific apparatus from the data storage unit.

7. The message relay apparatus as set forth in claim 1, further comprising:
an outside interface unit that receives a request to perform the conversion processing for the message from an outside apparatus; and
a data converter that performs the conversion processing for the message, and
wherein the outside interface unit returns a converted message processed by the data converter to the outside apparatus.

8. The message relay apparatus as set forth in claim 1, wherein the conversion processing is an extensible markup language conversion processing.

9. A message relay method, comprising:
first receiving, by using a computer, a message to be transferred;
second receiving, by using the computer, first data that announces that a transmission source apparatus of the first data can afford to perform the conversion processing;
storing, by using the computer, identification information of the transmission source apparatus of the first data in a data storage unit;
determining, by using the computer, whether or not the computer can afford to perform the conversion processing, before performing the conversion processing for the message;
selecting, by using the computer, another apparatus that can afford to perform the conversion processing based on the identification information stored in the data storage unit, upon detecting that the computer cannot afford to perform the conversion processing;
requesting, by using the computer, the selected another apparatus to perform the conversion processing for the message;
receiving, by using the computer, the converted message from the selected another apparatus; and
transmitting, by using the computer, the received and converted message to a transfer destination.

10. A computer-readable, non-transitory storage medium storing a program for causing a computer to execute a process, the process comprising:
first receiving a message to be transferred;
second receiving first data that announces that a transmission source apparatus of the first data can afford to perform a conversion processing;
storing identification information of the transmission source apparatus of the first data in a data storage unit;
determining whether or not the computer can afford to perform the conversion processing, before performing the conversion processing for the message;
selecting another apparatus that can afford to perform the conversion processing based on the identification information stored in the data storage unit, upon detecting that the computer cannot afford to perform the conversion processing;
requesting the selected another apparatus to perform the conversion processing for the message;
receiving the converted message from the selected another apparatus; and
transmitting the received and converted message to a transfer destination.

* * * * *